US009811604B2

(12) United States Patent
Gleicher et al.

(10) Patent No.: US 9,811,604 B2
(45) Date of Patent: Nov. 7, 2017

(54) METHOD AND SYSTEM FOR DEFINING AN EXTENSION TAXONOMY

(75) Inventors: Itzhak Gleicher, Thornhill (CA); Yi Jian Ren, Scarborough (CA); Christopher Phillip St. John, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 12/833,370

(22) Filed: Jul. 9, 2010

(65) Prior Publication Data
US 2012/0011118 A1    Jan. 12, 2012

(51) Int. Cl.
G06F 17/00    (2006.01)
G06F 17/30    (2006.01)
G06F 17/22    (2006.01)
G06Q 10/10    (2012.01)
G06Q 40/02    (2012.01)

(52) U.S. Cl.
CPC .... *G06F 17/30908* (2013.01); *G06F 17/2235* (2013.01); *G06Q 10/10* (2013.01); *G06Q 40/02* (2013.01)

(58) Field of Classification Search
CPC ..... G06F 17/2235; G06Q 10/10; G06Q 40/02
USPC .......................................................... 707/736
See application file for complete search history.

(56) References Cited

U.S. PATENT DOCUMENTS

| 7,415,482 B2* | 8/2008 | Blake et al. |
| 7,856,388 B1* | 12/2010 | Srivastava et al. ......... 705/36 R |
| 8,255,786 B1* | 8/2012 | Gattani ............. G06F 17/30014 715/205 |
| 8,271,870 B2* | 9/2012 | Verma ................... G06F 17/274 715/237 |

(Continued)

OTHER PUBLICATIONS

Piechocki et al., "Design and standardisation of XBRL solutions for governance and transparency", 2009 Palgrave Macmillan, International Journal of Disclosure and Governance vol. 6, 3, 224-240.*

*Primary Examiner* — Mariela Reyes
*Assistant Examiner* — Mohsen Almani
(74) *Attorney, Agent, or Firm* — Ryan Lewis; Edell, Shapiro & Finnan, LLC

(57) ABSTRACT

Embodiments of the invention generally provide a computer system, method implemented on a computer, and computer readable medium storing instructions for defining an extension taxonomy. The computer system comprises a processor and a memory storing instructions, the instructions being executable to configure the processor to provide a selection module operable to designate a selected portion of a source document, wherein the source document comprises a set of locations and a location map for identifying each location in the set of locations; wherein each location is configured to receive text-based content and wherein the selected portion comprises at least one location in the set of locations. The processor is also configured to provide: an extension module operable to associate a taxonomy element with a location in the selected portion; a connection module operable to define a location link between the identified taxonomy element and the location in the selected portion; and, a storage module operable to store the taxonomy element and the location link in a repository.

34 Claims, 10 Drawing Sheets

(56) References Cited

U.S. PATENT DOCUMENTS

| | | | |
|---|---|---|---|
| 2003/0041077 A1* | 2/2003 | Davis et al. | 707/500 |
| 2004/0017403 A1* | 1/2004 | Andersson | G06F 11/328 715/848 |
| 2005/0197931 A1* | 9/2005 | Gupta | G06Q 40/00 705/30 |
| 2006/0184539 A1* | 8/2006 | Blake et al. | 707/10 |
| 2007/0078877 A1* | 4/2007 | Ungar et al. | 707/101 |
| 2008/0255974 A1* | 10/2008 | Jacob et al. | 705/35 |
| 2010/0031141 A1* | 2/2010 | Summers et al. | 715/239 |
| 2011/0258167 A1* | 10/2011 | Binstock et al. | 707/690 |

\* cited by examiner

METHOD AND SYSTEM FOR DEFINING AN EXTENSION TAXONOMY

FIELD OF THE INVENTION

The embodiments described herein relate to systems and methods for defining a taxonomy, and in particular to systems and methods for defining an extension taxonomy using source documents.

INTRODUCTION

To comply with regulatory requirements, organizations are required to submit reports of financial data to regulatory bodies on a periodic basis. Organizations may generate reports of financial data using an eXtensible Business Reporting Language (XBRL) and submit the generated XBRL reports to a regulatory body. Other languages or formats may also be used to generate reports of financial data.

Organizations generate these reports using financial data contained within numerous documents and electronic financial records. The financial data contained within these documents and financial records may be modified. Any report based on the modified financial data should also be identified and updated. As these reports are submitted to regulatory bodies, it is important that the reports accurately reflect the organization's financial data. If the financial data is frequently updated then any report based on the updated financial data must be frequently identified and updated. Identifying reports that need updating and updating the financial data in the reports is time consuming and error prone.

SUMMARY

In accordance with an aspect of an embodiment of the present invention there is provided a computer system for defining an extension taxonomy, the computer system comprising a processor and a memory storing instructions, the instructions being executable to configure the processor to provide: a selection module operable to designate a selected portion of a source document; wherein the source document comprises a set of locations and a location map for identifying each location in the set of locations; wherein each location is configured to receive text-based content; wherein the selected portion comprises at least one location in the set of locations; an extension module operable to associate a taxonomy element with a location in the selected portion; a connection module operable to define a location link between the identified taxonomy element and the location in the selected portion; a storage module operable to store the taxonomy element and the location link.

In accordance with another aspect of an embodiment of the present invention there is provided a computer system wherein the selected portion comprises at least a first location and a second location; the extension module is further operable to associate a first taxonomy element with the first location and a second taxonomy element with the second location; the connection module is further operable to define a location link between the first taxonomy element and the first location and a location link between the second taxonomy element and the second location; and the storage module is further operable to store the taxonomy elements and the location links in the repository.

In accordance with another aspect of an embodiment of the present invention there is provided a computer system wherein the taxonomy element comprises attributes supported by eXtensible Business Reporting Language.

In accordance with another aspect of an embodiment of the present invention there is provided a computer system wherein the extension module is further operable to associate the taxonomy element with the location in the selected portion based on the text-based content within the location in the selected portion.

In accordance with another aspect of an embodiment of the present invention there is provided a computer system wherein the extension module is further operable to generate the taxonomy element to be associated with the location in the selected portion.

In accordance with another aspect of an embodiment of the present invention there is provided a computer system wherein the extension module is further operable to generate the taxonomy element based on the text-based content within the location in the selected portion.

In accordance with another aspect of an embodiment of the present invention there is provided a computer system further comprising a label module operable to associate the taxonomy element with at least one taxonomy element label, wherein the taxonomy element label is configured to receive text-based content.

In accordance with another aspect of an embodiment of the present invention there is provided a computer system wherein the label module is further operable to update the taxonomy element label based on the location link and the text-based content within the location in the selected portion.

In accordance with another aspect of an embodiment of the present invention there is provided a computer system wherein the label module is further operable to update the taxonomy element label in response to an update of the text-based content within the location in the selected portion.

In accordance with another aspect of an embodiment of the present invention there is provided a computer system further comprising a taxonomy generation module operable to generate an extension taxonomy comprising taxonomy elements and associated taxonomy element labels.

In accordance with another aspect of an embodiment of the present invention there is provided a computer system further comprising a relationship module operable to define one or more relationship links between two taxonomy elements, wherein each relationship link is a directional link connecting the two taxonomy elements.

In accordance with another aspect of an embodiment of the present invention there is provided a computer system the selected portion comprises at least a first location and a second location; the extension module is further operable to associate a first taxonomy element with the first location and a second taxonomy element with the second location; and the relationship module is further operable to define a relationship link between the first taxonomy element and the second taxonomy element based on the spatial arrangement of the first location and second location within the selected portion of the source document.

In accordance with another aspect of an embodiment of the present invention there is provided a computer system wherein: the source document further comprises metadata associated with a first location in the selected portion; the relationship module is further operable to define a relationship link between a first taxonomy element and a second taxonomy element based on the metadata associated with the first location.

In accordance with another aspect of an embodiment of the present invention there is provided a computer system wherein the selected portion comprises at least the first location and a second location; and, the extension module is further operable to associate the first taxonomy element with the first location and the second taxonomy element with the second location.

In accordance with another aspect of an embodiment of the present invention there is provided a computer system wherein the metadata is a formula that defines the text-based content received by the location.

In accordance with another aspect of an embodiment of the present invention there is provided a computer system wherein the metadata associated with the first location refers to the second location in the selected portion.

In accordance with another aspect of an embodiment of the present invention there is provided a computer system comprising a validation module operable to validate the one or more relationship links against a set of validation rules to determine if there is one or more validation errors; and upon determining that there is a validation error to generate a corresponding error message.

In accordance with another aspect of an embodiment of the present invention there is provided a computer system wherein the relationship module is further operable to define relationship links between taxonomy elements, wherein: each taxonomy element has a relationship link to zero or more child taxonomy elements; each taxonomy element has a relationship link to one or more parent taxonomy elements; and, there is one or more root taxonomy elements having no relationship link to a parent taxonomy element In accordance with another aspect of an embodiment of the present invention there is provided a computer system wherein the relationship links between taxonomy elements form an acyclic directed graph of nodes.

In accordance with another aspect of an embodiment of the present invention there is provided a computer system wherein the relationship module is further operable to detect cycles in the acyclic directed graph before defining a relationship link.

In accordance with another aspect of an embodiment of the present invention there is provided a computer system wherein the relationship module is further operable to: generate a copy of the existing acyclic graph; generate a new directed graph by adding a relationship link to the copy of the existing acyclic directed graph; determine if the new relationship link creates a cycle in the new directed graph; and, update the existing acyclic directed graph with the new graph if and only if no cycles are detected in the new graph.

In accordance with another aspect of an embodiment of the present invention there is provided a computer system further comprising a taxonomy generation module operable to generate an extension taxonomy comprising a collection of taxonomy elements arranged as a directed acyclic graph of nodes based on the parent and child relationship links between taxonomy elements.

In accordance with another aspect of an embodiment of the present invention there is provided a computer system wherein: a first taxonomy element is associated with a mathematical expression that refers to at least a second taxonomy element; and, the relationship module is further operable to define a relationship link between a first taxonomy element and a second taxonomy element based on the mathematical expression.

In accordance with another aspect of an embodiment of the present invention there is provided a computer system wherein: the source document further comprises metadata associated with a first location in the selected portion; the relationship module is further operable to determine the mathematical expression based on the metadata associated with the first location.

In accordance with another aspect of an embodiment of the present invention there is provided a computer system wherein: the selected portion comprises at least the first location and a second location; and, the extension module is further operable to associate the first taxonomy element with the first location and the second taxonomy element with the second location.

In accordance with another aspect of an embodiment of the present invention there is provided a computer system wherein: taxonomy elements define both the dimensions and members of an n-dimensional array; and, the relationship module is further operable to define relationship links between taxonomy elements that define the dimensions of the n-dimensional array.

In accordance with another aspect of an embodiment of the present invention there is provided a computer system wherein the relationship module is further operable to define relationship links between taxonomy elements, wherein: each taxonomy element has a relationship link to zero or more child taxonomy elements; and, each taxonomy element and its zero or more children is associated with at most one n-dimensional array.

In accordance with another aspect of an embodiment of the present invention there is provided a computer system wherein the relationship module is further operable to define relationship links between taxonomy elements that define the members of an n-dimensional array.

In accordance with another aspect of an embodiment of the present invention there is provided a computer system further comprising a group module operable to define a set of relationship groups, wherein a relationship group is configured to provide a container for a set of relationship links.

In accordance with another aspect of an embodiment of the present invention there is provided a computer system wherein: relationship groups are associated with a definition configured to receive text-based content; the extension module is further operable to associate a relationship group with a location in the selected portion; the connection module is further operable to define a group link between the identified relationship group and the location in the selected portion; and, the label module is further operable to update a relationship group definition based on the group link and the text based content within the selected portion.

In accordance with another aspect of an embodiment of the present invention there is provided a computer system further comprising a validation module operable to validate the taxonomy elements and taxonomy element labels against a set of validation rules to determine if there is one or more validation errors; and upon determining that there is a validation error to generate a corresponding error message.

In accordance with another aspect of an embodiment of the present invention there is provided a computer system wherein: the extension taxonomy is associated with a base taxonomy comprising zero or more taxonomy elements; and, the validation module is further operable to select the set of validation rules based on the base taxonomy.

In accordance with another aspect of an embodiment of the present invention there is provided a computer system wherein the validation module is further operable upon determining that there is a validation error to determine one or more quick fix remedies based on the set of validation rules.

In accordance with another aspect of an embodiment of the present invention there is provided a computer system further comprising a validation module operable to validate the taxonomy elements and relationship links against a set of validation rules to determine if there is one or more validation errors; and upon determining that there is a validation error to generate a corresponding error message.

In accordance with another aspect of an embodiment of the present invention there is provided a computer system further comprising a taxonomy import module operable to import an existing taxonomy comprising zero or more taxonomy elements; and, wherein the extension module is further operable to associate a taxonomy element from the imported taxonomy with a location in the selected portion.

In accordance with another aspect of an embodiment of the present invention there is provided a method for defining an extension taxonomy, wherein the method is implemented on a processor and a memory storing instructions, the instructions being executable to configure the processor to perform operations comprising: designating a selected portion of a source document wherein: the source document comprises a set of locations and a location map for identifying each location in the set of locations; each location is configured to receive text-based content; the selected portion comprises at least one location in the set of locations; associating a taxonomy element with a location in the selected portion; defining a location link between the identified taxonomy element and the location in the selected portion; storing the taxonomy element and the location link in a repository.

In accordance with another aspect of an embodiment of the present invention there is provided a method further comprising associating the taxonomy element with the location in the selected portion based on the text-based content within the location in the selected portion.

In accordance with another aspect of an embodiment of the present invention there is provided a method further comprising generating the taxonomy element to be associated with the location in the selected portion.

In accordance with another aspect of an embodiment of the present invention there is provided a method further comprising associating the taxonomy element with at least one taxonomy element label, wherein the taxonomy element label is configured to receive text-based content.

In accordance with another aspect of an embodiment of the present invention there is provided a method further comprising updating the taxonomy element label based on the location link and the text-based content within the location in the selected portion.

In accordance with another aspect of an embodiment of the present invention there is provided a non-transitory computer-readable medium upon which a plurality of instructions are stored, the instructions for performing the steps of: designating a selected portion of a source document wherein: the source document comprises a set of locations and a location map for identifying each location in the set of locations; each location is configured to receive text-based content; the selected portion comprises at least one location in the set of locations; associating a taxonomy element with a location in the selected portion; defining a location link between the identified taxonomy element and the location in the selected portion; and storing the taxonomy element and the location link in a repository.

These and other aspects and features of various embodiments will be described in greater detail below.

BRIEF DESCRIPTION OF THE DRAWINGS

For a better understanding of the example embodiments described herein, and to show more clearly how they may be carried into effect, reference will now be made, by way of example, to the accompanying drawings in which.

Figure 1:
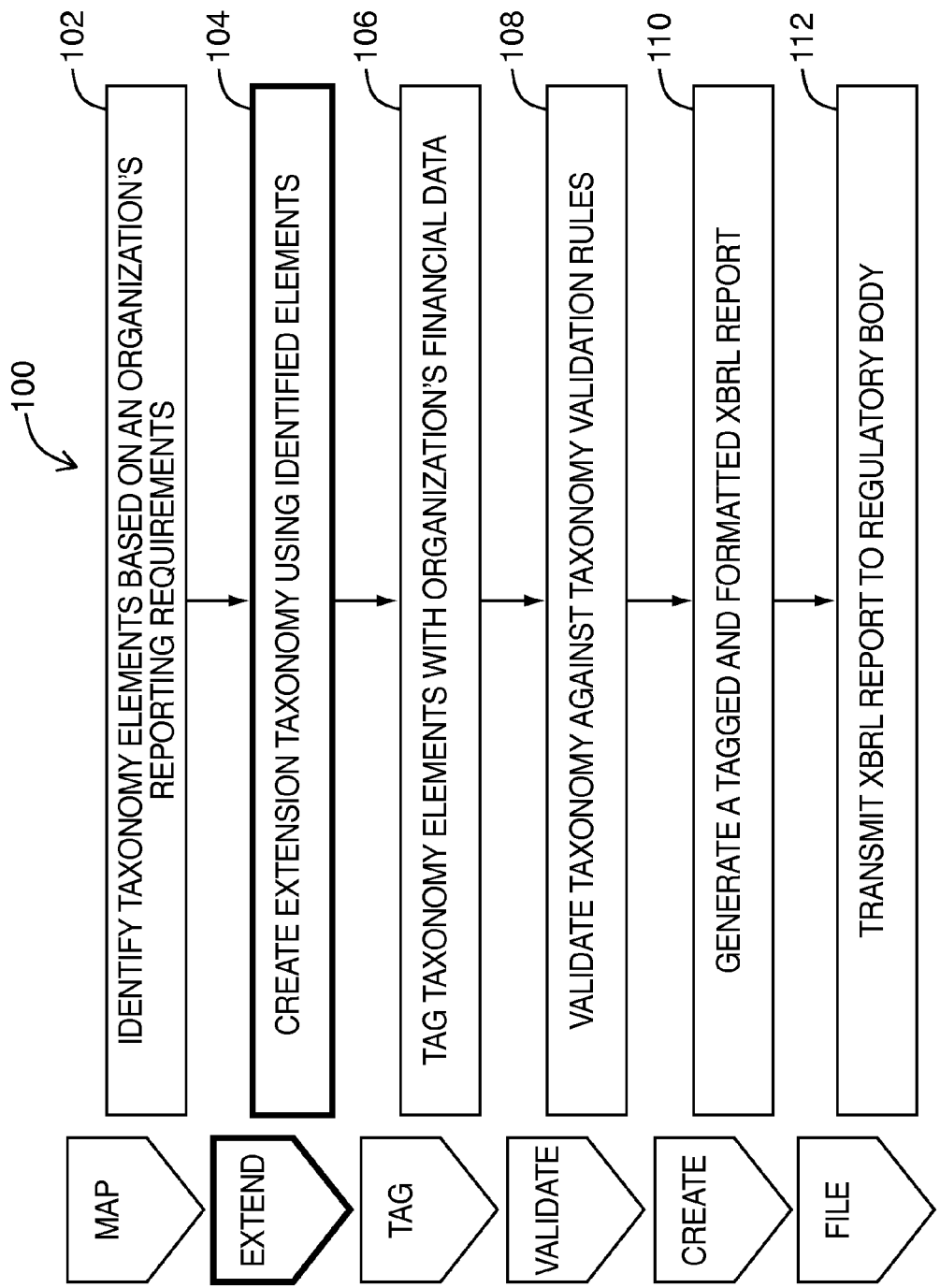
FIG. 1 is a flowchart diagram illustrating the basic operational steps for generating and filing a report.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to input data to perform the functions described herein and generate output information. The output information is applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette), readable by a general or special purpose programmable computer, for configuring and operating the computer when the storage media or device is read by the computer to perform the procedures described herein. The inventive system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

FIG. 1, illustrates a flowchart of a method 100 executed by an overall system for generating and filing a report with a regulatory body. To generate the report, the system classifies an organization's financial data using a taxonomy. A taxonomy is a collection of taxonomy elements arranged in a hierarchical structure to define supertype-subtype relationships.

At step 102, the overall system identifies taxonomy elements based on the organization's reporting requirements and financial data type.

For example, the system may generate a report using the eXtensible Business Reporting Language ("XBRL"). XBRL is a communication method for electronic business reporting and provides a standard for financial reporting. XBRL configures a system to prepare, extract, publish and exchange financial data XBRL is a report format that is used by regulatory bodies for financial data reporting purposes, such as the U.S. Securities and Exchange Commission (SEC) and the U.K. HM Revenue & Customs (HMRC), for example. XBRL is also the basis for the International Financial Reporting Standards (IFRS), which have been adopted by international regulatory bodies. As an illustrative example, XBRL and the SEC are referred to herein, however, the embodiments described herein may relate to other financial reporting formats, languages, reporting requirements, countries, and regulatory bodies.

XBRL is a member of the family of languages based on Extensible Markup Language (XML), a standard for the electronic exchange of data. XML uses tags to contextualize data content in order to facilitate efficient computer processing. XBRL is a version of XML defined to meet the requirements of business and financial reporting. XBRL enables unique identifying tags to be applied to items of financial data. These tags may be used to provide a range of information about the tagged item. For example, tags may be used to define whether an item is a monetary item, a percentage or a fraction. XBRL also allows multiple labels in any language to be applied to items. XBRL may also be used to show how items are related to one another. For example, XBRL may be used to represent how items are calculated. XBRL can also be used to group items for organizational or presentational purposes. XBRL is also extensible which permits organizations to adapt it to meet their individual needs. For example, XBRL can handle data in different languages and accounting standards and may be flexibly adapted to meet different regulatory requirements and uses.

To generate an XBRL report, the system uses an XBRL taxonomy to map taxonomy elements to data contained in financial records and reports.

The system may generate the XBRL report using a base XBRL taxonomy published by a regulatory body. For example, the U.S. government publishes a base taxonomy referred to as the US General Accepted Accounting Principles (US-GAAP) taxonomy. Similarly, the U.K. government publishes a base taxonomy referred to as the U.K. General Accepted Accounting Principles (UK-GAAP) The US-GAAP taxonomy, for example, provides a standardized dictionary of financial concepts required for reporting purposes. The system may be configured using the US-GAAP taxonomy to generate reports suitable for filing with the SEC. Similarly, the system may be configured using the UK-GAAP taxonomy to generate reports suitable for the HMRC. Other taxonomies may be used to facilitate financial reporting with other regulatory bodies.

Taxonomy elements define financial concepts. The system defines an XBRL taxonomy element by attributes. The system further defines an XBRL taxonomy element by relationships to other taxonomy elements. The system stores the taxonomy elements and their attributes in a schema file that defines name, data type, period type and control parameters. The system stores data defining relationships between XBRL taxonomy elements in linkbase files. The following provides example linkbase files that may be used by the system:
  (i) a presentation linkbase: provides information about the hierarchical (parent-child) relationships between elements and establishes a sequence of elements;
  (ii) a definition linkbase: defines multi-dimensional relationships between elements;
  (iii) a calculation linkbase: defines basic calculation relationships or formulas between elements;
  (iv) label linkbase: associates labels with elements; and,
  (v) reference linkbase: associates external information with elements.

At step 104, the system creates an extension taxonomy for the organization using the taxonomy elements identified at step 102 based on the organization's financial data type and reporting requirements.

The system may use a base taxonomy, such as the US-GAAP described above. The system is further operable to generate custom taxonomy elements to create an extension taxonomy. An extension taxonomy may be a new taxonomy, or may extend information from a base taxonomy (e.g. US-GAAP) with extension taxonomy elements. That is, the system creates an extension taxonomy by adding taxonomy elements to a taxonomy, such as a new taxonomy or a base taxonomy.

As an example, the system may identify company-defined financial data (e.g. a financial line item or concept) in an organization's financial documents that is not defined by a taxonomy element in the base taxonomy. The organization may need to include this company-defined financial data in a report. The system may generate an extension taxonomy element based on company-defined financial data.

The taxonomy elements of a base taxonomy provide the system with a "base" or starting point for defining a company specific extension taxonomy. The system may add, prohibit, remove or modify some data in the base taxonomy (e.g., element labels, linking, order of appearance and other characteristics) to define an extension taxonomy. The system uses an extension taxonomy to customize a base taxonomy to meet the specific reporting needs of an organization. The use of a base taxonomy with standard taxonomy elements may be desirable as it may enable comparability between XBRL reports from different organizations.

The system is operable to create an extension taxonomy by, for example, the following:
- defining an extended taxonomy namespace;
- creating new relationship groups for taxonomy elements;
- defining taxonomy attributes or properties;
- selecting or creating labels for taxonomy elements;
- adding elements to define hierarchies;
- adding new or existing elements to the hierarchy;
- defining relationships between taxonomy elements;
- searching for suitable base taxonomy elements;
- and validating the extended taxonomy.

At step 106 the system tags the organization's financial data values to be reported to the regulatory body with the taxonomy elements, defined at step 104. This process may be referred to as tagging as it associates or tags the financial values with taxonomy elements.

For example, the system may tag the taxonomy element: "us-gaap:TaxesPayableCurrent" with the value "254,897.23", if the organization's electronic financial records indicate this amount of taxes currently owed by the organization. The process of tagging financial values with specific taxonomy elements may include defining time periods, units of measure and other aspects or attributes specific to an XBRL report and its XBRL taxonomy elements.

At step 108, the system validates the taxonomy elements and values against a set of taxonomy validation rules to determine if the correct financial concepts and relationships are configured.

As an example, extensions of the US-GAAP taxonomy may be validated against a set of validation rules entitled the "Electronic Data-Gathering, Analysis, and Retrieval (ED-GAR) system's Filer Manual Rules". The system may be operable to produce an error report or list of errors using the validation results.

At step 110, the system uses the validated and tagged taxonomy to generate a tagged and formatted XBRL report (e.g. an XBRL instance document) for submission to the regulatory body. The system is operable to prepare the report for submission by performing the following: validating the XBRL report against the EDGAR Filer Manual Rules; reviewing the XBRL report with a SEC Private Previewer; and, performing a test submission with the SEC for validation purposes.

At step 112, the system transmits the tagged and formatted XBRL report to the regulatory body. In some embodiments, system may transmit the XBRL report to a remote server connected to the system via, for example, a network.

Figure 2:
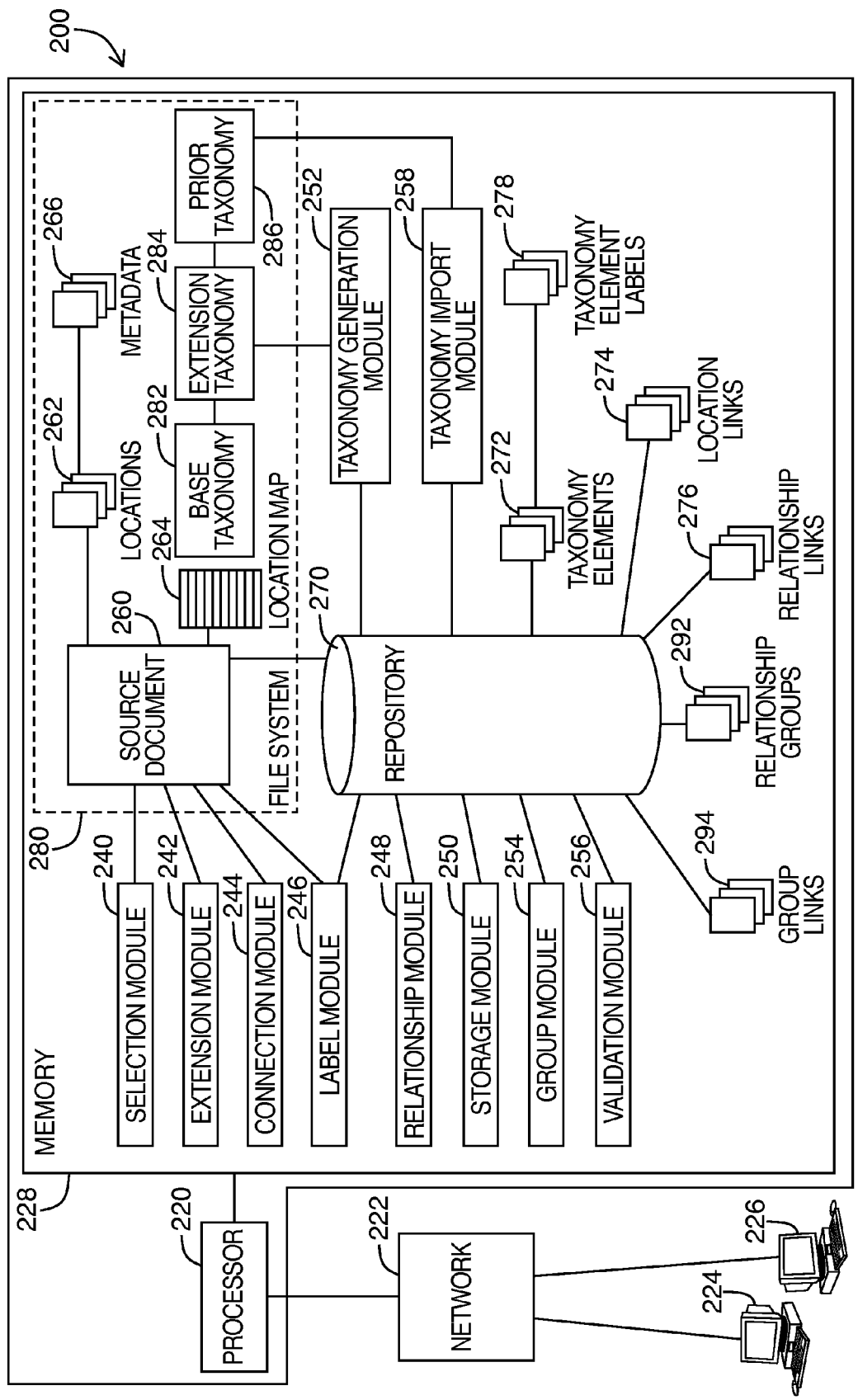
FIG. 2 is a block diagram of a system for defining an extension taxonomy in accordance with an example embodiment.

FIG. 2 illustrates a block diagram of a system 200 for defining an extension taxonomy. System 200 is operable to automatically generate and configure taxonomy elements and their associated relationships. System 200 tags the configured taxonomy elements to content stored in source documents.

Source documents include financial reports prepared by or on behalf of organization. System 200 is operable to extract metadata from the source documents to automatically define taxonomy elements and/or relationships between taxonomy elements (e.g. XBRL presentation, calculation, definition and label linkbases). For example, system 200 is operable to generate a company specific taxonomy as described with respect to step 104 of FIG. 1.

System 200 comprises a processor or central processing unit (CPU) 220 and memory 228 storing instructions (which may include random access memory (RAM) and read-only memory (ROM), and persistent storage such as flash memory, for example). Processor 220 controls the overall operation of memory 228.

System 200 executes instructions stored in memory 228 to configure the processor 220 to provide a number of functional elements including:
- a selection module 240 operable to designate a selected portion of a source document 260;
- an extension module 242 operable to associate a taxonomy element 272 with a location 262 in a source document 260;
- a connection module 244 operable to define a location link 274 between a taxonomy element 272 and a location 262 in a source document 260;
- a label module 246 operable to update attributes of a taxonomy element 272;
- a relationship module 248 operable to define relationship links 276 between taxonomy elements 272;
- a storage module 250 operable to store components of a taxonomy in the repository 270;
- a taxonomy generation module 252 operable to generate an extension taxonomy 284 as may be stored in file system 280;
- a group module 254 operable to define relationship group links 294 and relationship groups 292 that may be configured to provide a container for relationship links 276;
- a validation module 256 operable to validate a taxonomy against a set of rules; and
- a taxonomy import module 258 operable to import a prior taxonomy 286.

Figure 3:
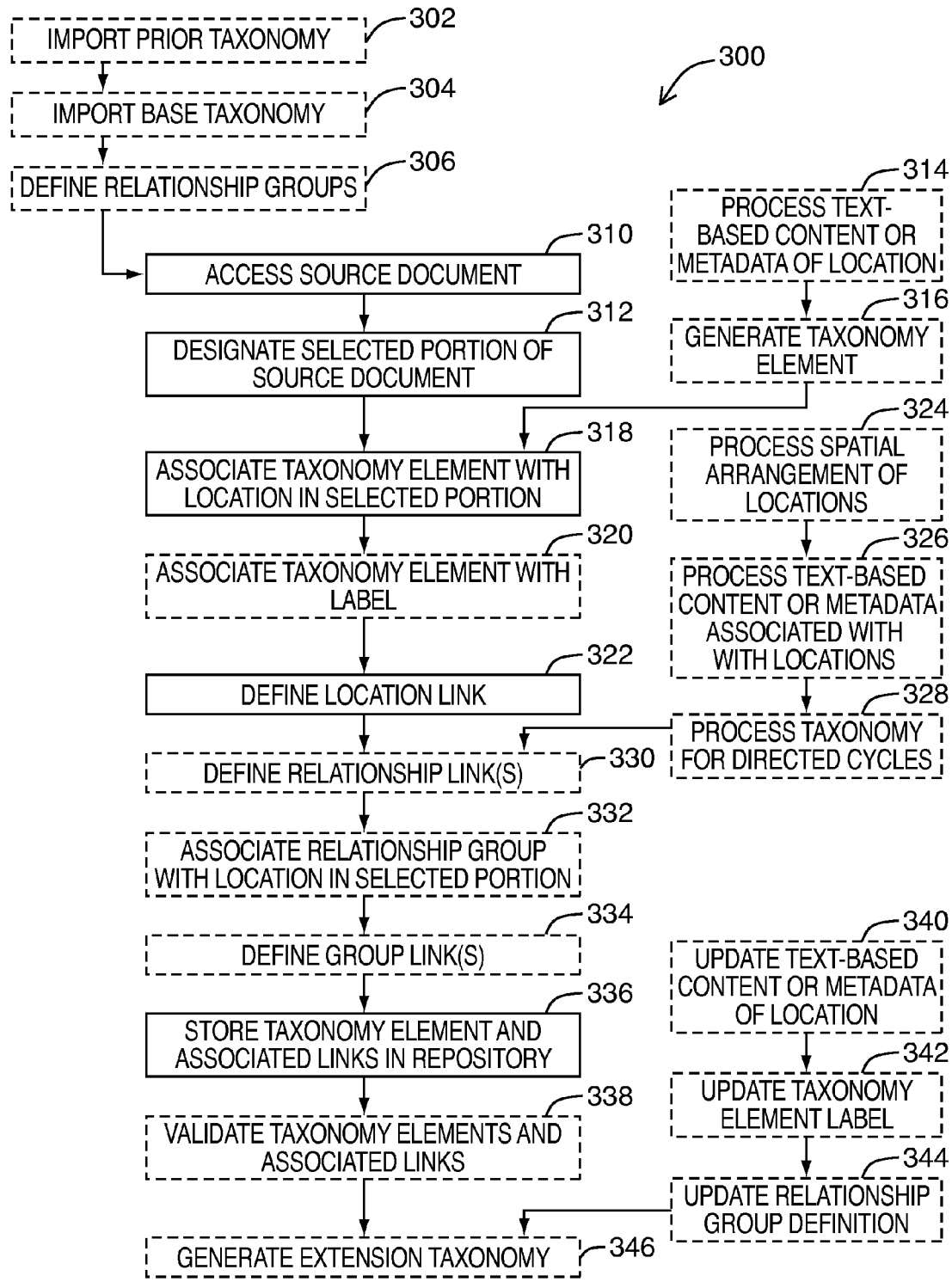
FIG. 3 is a flowchart illustrating the steps of a method for defining an extension taxonomy in accordance with an example embodiment.

The operation and interaction of these components will be explained in further detail herein in relation to FIG. 3, for example.

The processor 220 is also operatively connected to numerous input and output devices via a network 222. The network 222 may incorporate or otherwise be operatively coupled to different types of networks (e.g. Local Area Networks (LANs), Wide Area Networks (WANs), the Internet), and may be wired (e.g. through an Ethernet, serial or Asynchronous Transfer Mode (ATM) connection) or wireless (e.g. through 802.11 Wireless Local Area Network (WLAN), or cellular standards), for example.

The network 222 may also be operatively connected to input and output terminals such as user terminals 224 and 226, which may, for example, be in the form of desktops, laptops, or mobile computing devices. The terminals 224, 226 may comprise a display device (e.g. a Liquid Crystal Display (LCD) or Organic Light Emitting Device (OLED) flat panel screen), which may be touch enabled to facilitate input. The terminals 224, 226 may also include other input devices operatively connected to the display (e.g. keyboard, mouse, card reader, touch pad). Furthermore, the terminals may comprise a processor and memory as might be the case with a laptop, for example. Terminals 224 and 226 may be mobile devices or located at a different location than system 200.

System 200 communicates with terminals 224, 226 via network 222. In alternate embodiments, the terminals 224, 226 may comprise the processor 220 and/or memory 228 allowing for local and/or distributed control of memory 228. Furthermore, the repositories and files systems described herein may be implemented as remote databases and file systems that may be accessible across computer networks (including the Internet) through database server software or remote file system software.

In further alternate embodiments, some or all of the software, hardware and databases described herein may be implemented remotely such that processor 220 and some or all of system 200 may be in one geographical location, and users accessing the system 200 (e.g. through terminals 224 and 226 or through a web browser or a "thin" client) may be in another geographical location.

System 200 executes instructions stored in memory 228 to configure the processor to provide a file system 280 that may also be stored in memory 228. The file system 280 may contain one or more source documents 260, a base taxonomy 282, an extension taxonomy 284, and a prior taxonomy 286.

The source document 260 may comprise a set of locations 262 that may be referenced by the file system 280 or memory 228. Each location 262 may be configured to receive text-based content such as, for example, words, numbers or mixed character strings. Each location 262 in the source document 260 may also be associated with metadata 266. System 200 is operable to extract metadata 266 from the source document to define additional attributes for a taxonomy element associated with a location 262. A source document 260 may also comprise a location map 264 to identify each location in the set of locations 262.

System 200 executes the instructions stored in memory 228 to configure the processor to provide a repository 270 that may also be stored in memory 228. The repository 270 is operable to store various components of a taxonomy including taxonomy elements 272, location links 274, relationship links 276, relationship groups 292 and group links 294. Taxonomy elements 272 may be associated with taxonomy element labels 278.

In at least one embodiment the repository 270 may be implemented as a relational database, however those skilled in the art will appreciate that other implementations of the repository 270 are possible (e.g. Key/Value databases, Object-Oriented databases, XML databases, Documents databases, and Spreadsheets). Repository 270 may reside in memory 228, but need not reside in memory 228 and may be in another physical location and accessed by system 200 over a network.

Figure 4:
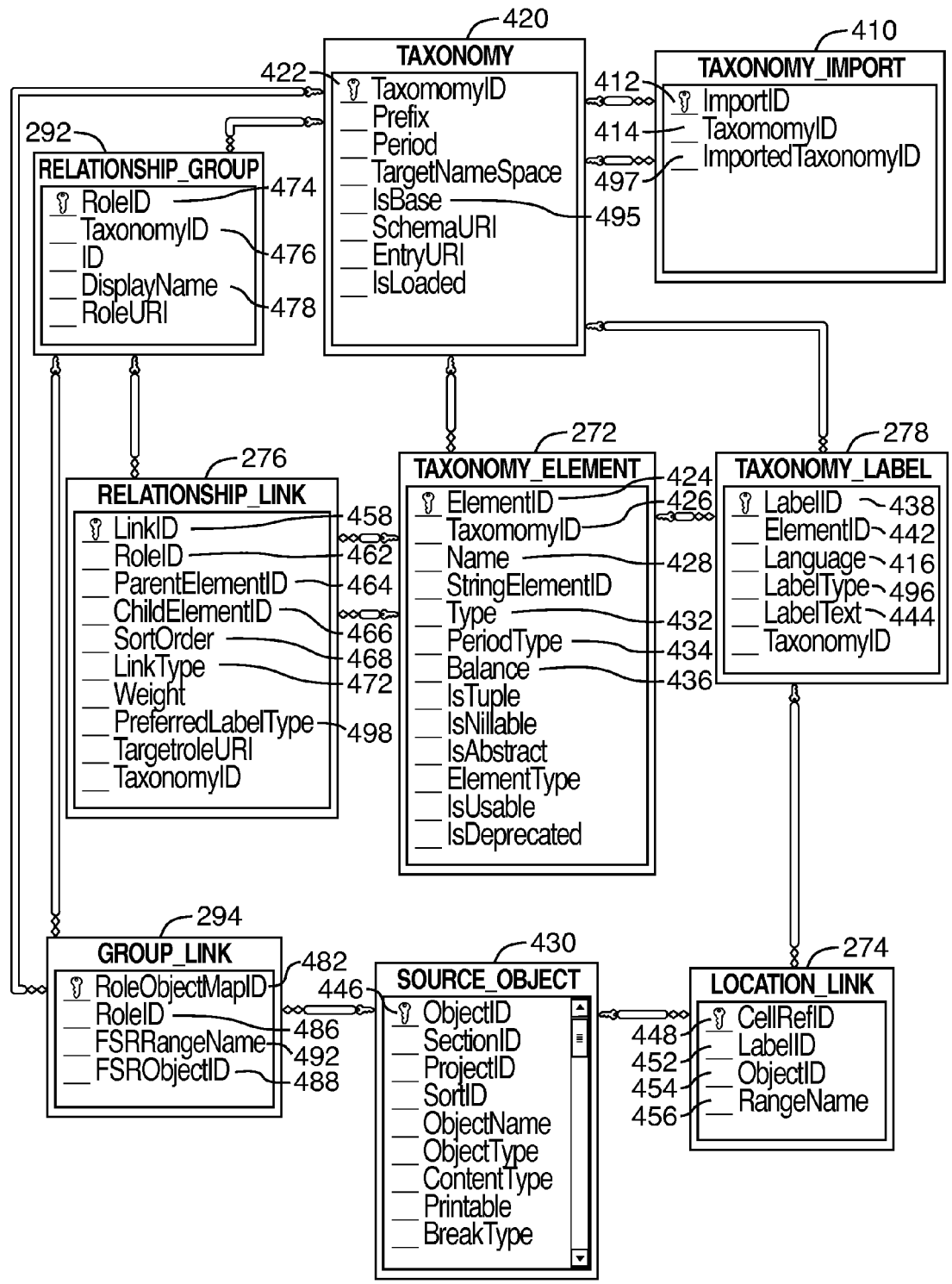
FIG. 4 is a schematic diagram of example data classes defining a taxonomy.

FIG. 4 shows a schematic diagram of example data classes for defining an XBRL extension taxonomy as may be stored in the repository 270 of FIG. 1. The data structures shown in FIG. 4 are provided for example purposes only and are not to be construed as limiting. Variations to the types of data stored and the organizational structures used to store information in the system 200 are possible in alternative embodiments (e.g. embodiments storing other types of extension taxonomies).

FIG. 4 illustrates that system 200 stores an XBRL extension taxonomy as a relational database structure as a group of interrelated database tables. Rows in relational database tables may refer to one another using foreign key references.

Each table in a relational database may have a primary key (e.g. one or more fields or columns that uniquely identify a record or row in the table). The primary key of a table A may be used by another table B (e.g. a foreign key reference) to refer to a specific record in table A.

The Taxonomy table 420 defines taxonomies known to system 200, including extension taxonomies, base taxonomies and imported prior taxonomies. The Taxonomy table 420 comprises a unique primary key TaxonomyID 422 that uniquely identifies a taxonomy in the repository 270. The repository 270 may store multiple extension and base taxonomies and each record in Taxonomy table 420 may define a unique extension or base taxonomy.

As described, system 200 creates an extension taxonomy by adding taxonomy elements to taxonomies known to system 200, such as one or more base taxonomies or imported taxonomies, for example. An extension taxonomy may comprise one or more taxonomies known to system 200 as defined by records of Taxonomy table 420. When system 200 extends a base taxonomy, system 200 may define a link between a base taxonomy and an extension taxonomy that extends the base taxonomy. System 200 may identify a base taxonomy by, for example, determining whether a row of the Taxonomy table 420 corresponds with a row in the Taxonomy_Import table 410 using TaxonomyID 414, 422. Further, system 200 may identify a base taxonomy using IsBase 495 of Taxonomy table 420. System 200 is operable to identify a taxonomy as a base taxonomy if IsBase=true. For other taxonomies, such as user created taxonomies, IsBase=false. System 200 may interpret taxonomies that have IsBase=false as user specific taxonomies and may display these user specific taxonomies to users to work with. System 200 may import a base taxonomy using, for example, the taxonomy import module 258. When system 200 imports a base taxonomy (e.g. US-GAAP) and further extends the base taxonomy to create an extension taxonomy then system 200 may create two taxonomy records: one record for the exension taxonomy (with IsBase=false) and one record for the base taxonomy (IsBase=true) if the base taxonomy record does not exist as a record of Taxonomy table 420 already. System 200 may also create a taxonomy_import 410 record to link the extension taxonomy and base taxonomy together.

System 200 may import prior taxonomies using, for example, the taxonomy import module 258. System 200 imports a prior taxonomy 286 to establish one or more new taxonomy records, including taxonomy elements, labels, groups, links, base taxonomy imports, etc. The Taxonomy_Import table 410 comprises a unique primary key ImportID 412 that may uniquely identify a single import relationship between two taxonomies. The Taxonomy_Import table 410 may correspond with a taxonomy using the TaxonomyID 414, which is a foreign key reference to the TaxonomyID 422 of Taxonomy table 420 and may be used to identify the extension taxonomy. The Taxonomy_Import table 410 may reference a imported taxonomy extended by the extension taxonomy using ImportedTaxonomyID 497.

A taxonomy is comprised of zero or more taxonomy elements. System 200 may store each taxonomy element as a record in the Taxonomy_Element table 272. The Taxonomy_Element table 272 comprises a unique primary key ElementID 424 that uniquely identifies a taxonomy element in the repository 270. The Taxonomy_Element table 272 also comprises a TaxonomyID 426 that is a foreign key reference to the TaxonomyID 422 of Taxonomy table 420 and identifies the taxonomy (e.g. base taxonomy or extension taxonomy) in which the taxonomy element is defined.

The TaxonomyID 426 may also be used to determine if the taxonomy element is a member of a base taxonomy using, for example, the corresponding TaxonomyID 422 and IsBase 495 attributes of the Taxonomy table 420. The functionality of a taxonomy element may be based on whether the taxonomy element is associated with a base taxonomy (e.g. IsBase=true) or an extension taxonomy (IsBase=false). For example, a user may not be allowed to modify the properties of a taxonomy element belonging to a base taxonomy in order to preserve the original structure, for example. The regulatory body may implement a standard base taxonomy that may not be modified. The Taxonomy_Element table 272 may also comprise the following attributes:

Name 428: refers to the taxonomy element name. The name 428 may be unique within the single taxonomy (e.g. a base taxonomy) but may not be unique within a set of taxonomies (e.g. a group of imported taxonomies). For example, two extension taxonomy elements for a taxonomy may not both be named "Assets". However, it may be possible to create an extension element called "Assets" even though the base taxonomy (e.g. US-GAAP taxonomy), names a taxonomy element "Assets". System 200 may be operable to use a StringElementID field to prepend a taxonomy prefix to the name (e.g. "csj_Assets", "us-gaap_Assets") to make the two names unique within the taxonomy set;

Type 432 used to define the type of data stored by the taxonomy element (e.g. number, currency, date, time, percentage, fraction);

PeriodType 434 that defines whether the data stored by the taxonomy element is for an instant (e.g. specific point in time) or duration (e.g. date range); and Balance 436 which defines whether the data stored by the taxonomy element is a debit or a credit (e.g. a positive or negative value).

A taxonomy element may have one or more associated labels that may be stored in a label linkbase. In an embodiment, taxonomy element labels may be stored in the Taxonomy_Label table 278. The Taxonomy_Label table 278 comprises a unique primary key LabelID 438 that uniquely identifies the taxonomy label in the repository 270. The Taxonomy_Label table 278 also comprises an ElementID field 442 that is a foreign key reference to the ElementID 424 of the Taxonomy_Element table 272 and identifies the taxonomy element to which the taxonomy element label applies. The Taxonomy_Label table 278 also comprises a LabelType field 496 that may be used to differentiate labels that are associated with the same Taxonomy_Element 272. Similarly, Taxonomy_Label table 278 also comprises a Language field 416 that may be used to differentiate labels based on an associated language. The Taxonomy_Label table 278 may comprise a LabelText field 444 which may be configured to receive text-based content. A taxonomy element 272 may have zero or more taxonomy element labels 278. The Taxonomy_Label table 278 may comprise TaxonomyID 422 which allows system 200 to create new labels for taxonomy elements in the context of taxonomies other than the taxonomy that originally defines the taxonomy element. For example, the base taxonomy US-GAAP may define a label for the taxonomy element us-gaap_Assets. In this case, the TaxonomyID 422 for the taxonomy element and the label would match. However, an extension taxonomy may provide an additional label for the same taxonomy element (using for example text based content from a location in the source document) and the taxonomy label 278 would also have a TaxonomyID 422 that references the extension taxonomy.

An embodiment of system 200 allows taxonomy element labels 278 to be associated with locations 262 in source documents 260. As previously described, system 200 may store source documents 260 in the file system 280. System 200 may identify or alternatively store source documents in the repository 270 using the Source_Object table 430. For example, in at least one embodiment the Source_Object 430 may comprise a reference or pointer to the source document 260 in the file system 280. In an alternate embodiment the Source_Object and/or related database tables may store the components of a source document 260. The Source_Object table 430 comprises a unique primary key ObjectID 446 that uniquely identifies the source object or source document in the repository 270.

System 200 may associate taxonomy element labels 278 with a location 262 in source document 260 using the Location_Link table 274. The Location_Link table 274 comprises a unique primary key CellRefID 448 that uniquely identifies the location link in the repository 270. The Location_Link table 274 may also comprise the following attributes: a LabelID 452 that is a foreign key reference to the LabelID 438 of the Taxonomy_Label table 278 and identifies the taxonomy element label 278 to which the location link applies; an ObjectID 454 that is a foreign key reference to the ObjectID 446 of the Source_Object table 430 and identifies the source document to which the location link applies; and, a RangeName 456 comprising a reference to a location or range of locations 262 within the source document 260.

Those skilled in the art will appreciate that in the embodiment shown the location link 274 indirectly links a taxonomy element 272 to a source document 260. In alternate embodiment a location link 274 may be used to directly link taxonomy elements 272 and source documents 260. For example, instead of a Taxonomy_Label table 278 taxonomy labels could be stored as part of the Taxonomy_Element table 272 and taxonomy labels may be associated with a location 262 in a source document 260 by linking the source document directly with a taxonomy element using the Location_Link table 274.

As previously described, a taxonomy is a particular classification of elements arranged in a hierarchical structure. Taxonomy elements may therefore be related to one another (e.g. in order to define a hierarchy). For example, in XBRL taxonomy elements may be related to one another using relationships (e.g. presentation, calculation, definition and label) that are stored in linkbases. In system 200 relationships between taxonomy elements may also be grouped together to, for example, facilitate filtering of relationship links for visual presentation and editing purposes.

System 200 may store relationship groups in the repository 270 using the Relationship_Group table 292. The Relationship_Group table 292 comprises a unique primary key RoleID 474 that uniquely identifies the relationship group in the repository 270. The Relationship_Group table 292 may also comprise the following: a TaxonomyID 476 that is a foreign key reference to the TaxonomyID 422 of the Taxonomy table 420; and, a DisplayName 478 which may be configured to receive text-based content. A relationship group 292 may be associated with many relationship links 276.

System 200 may create relationships between taxonomy elements in the repository 270 using the Relationship_Link table 276. The Relationship_Link table 276 comprises a unique primary key LinkID 458 that uniquely identifies the relationship link in the repository 270. The Relationship_Link table 276 may also comprise the following attributes: a RoleID 462 that is a foreign key reference to the RoleID 474 of the Relationship_Group table 292 and defines the relationship group to which the relationship link belongs; a ParentElementID 464 that references the ElementID 424 of a parent taxonomy element in the taxonomy hierarchy; a ChildElementID 466 that references the ElementID 424 of a child taxonomy element in the taxonomy hierarchy; a SortOrder 468 that defines a relative ordering of taxonomy elements with the same ParentElementID 464; a LinkType 472 that defines the type of relationship link; and, a PreferredLabelType 498 that defines the default taxonomy element label 278 for that relationship link (e.g. where the taxonomy element 272 identified by ChildElementID 466 contains multiple labels 278 with different types 496). System 200 may create more than one relationship link to the same taxonomy element 272 and specify a different preferred label type for each relationship link. The hierarchical relationships between taxonomy elements are described further below. In XBRL there are 8 different LinkTypes 472 including: Calculation Link=1; Presentation Link=2; Hypercube Dimension=3; Dimension Domain=4; Dimension Default=5; Domain Member=6; Element Includes Cube=7; and Element Excludes Cube=8 which are used to define the presentation, calculation and definition relationships between taxonomy elements 272. These LinkTypes 472 may be divided into three broad sets of link types including: presentation links; calculation links; and, definition links.

Another embodiment of system 200 associates relationship groups 292 with locations 262 in source documents 260. Relationship groups 292 may be associated with locations 262 using the Group_Link table 294. The Group_Link table 294 comprises a unique primary key RoleObjectMapID 482 that uniquely identifies the group link in the repository 270. The Group_Link table 294 may also comprise the following attributes: a RoleID 486 that is a foreign key reference to the RoleID 474 of the Relationship_Group table 292 and defines the relationship group to which the group link applies; an FSRObjectID 488 that is a foreign key reference to the ObjectID 446 of the Source_Object table 430 and identifies the source document to which the group link applies; and, an FSRRangeName 492 comprising a reference to a location or range of locations 262 within the source document. Further information regarding relationship groups is provided herein in relation to Steps 332, 334, and 344.

Referring again to FIG. 3, the steps of a method 300 for defining an extension taxonomy, in accordance with at least one embodiment will now be described in more detail.

Step 302, system 200 imports a prior taxonomy 286. Taxonomy import module 258 is operable to import a prior taxonomy 286 comprising zero or more taxonomy elements by, for example, modifying or generating taxonomy elements 272 and other taxonomy components and storing them in the repository 270. When system 200 imports a prior taxonomy 286 that is not a base taxonomy then system 200 creates a taxonomy record 420 where is Base=false.

System 200 is operable to load taxonomies that were previously generated for viewing and/or editing. The prior taxonomy 286 may have been previously generated by, for example, the system 200, a third party (e.g. the SEC US-GAAP taxonomy), another taxonomy generation system, or manually. The taxonomy import module 258 may also be operable to import other components of a taxonomy including relationship links 276 from the prior taxonomy 286. The taxonomy elements and components of the imported prior taxonomy 286 may be stored in the repository 270. A prior taxonomy 286 may represent, for example, a partially or fully realized company specific XBRL taxonomy. The components of an imported prior taxonomy 286 may be fully editable by system 200 (e.g. where the taxonomy element is not a base taxonomy element associated with the taxonomy import table 410). Importing a prior taxonomy may also comprise the importing of base taxonomies upon which the prior taxonomy relies (see description of Step 304 below).

File system 280 may store a prior taxonomy 286. For example, the prior taxonomy may comprise a document that complies with XML or XBRL standards and which may be parsed and loaded by the taxonomy import module 258 using, for example, a third party XML parser. In alternate embodiments, the prior taxonomy may be stored as, for example, a database export file that describes database objects that may be loaded into the repository 270 by the taxonomy import module 258. In another embodiment, the prior taxonomy may reside in a remotely located repository (not shown) to which the system 200 is operatively connected via network 222.

At Step 304 system 200 imports a base taxonomy 282. When system 200 imports a base taxonomy 282 then system 200 creates a taxonomy record 420 for the base taxonomy, with is Base=True. System 200 creates a Taxonomy_Import record to link an extension taxonomy with the imported base taxonomy.

In some embodiments, the base taxonomy elements may not be modified in order to preserve the original structure. The regulatory body may implement a standard base taxonomy that may not be modified.

The process for importing a base taxonomy 282 may be substantially similar to that discussed above with respect to importing a prior taxonomy 286. Elements of a base taxonomy (e.g. taxonomy elements associated with the taxonomy import table 410) may not be fully editable.

At Step 306 system 200 defines relationship groups 292. System 200 may modify or generate new relationship groups 292 and store them in the repository 270. The stored relationship groups 292 may comprise a set of relationship groups. As shown in FIG. 4, a relationship group 292 may comprise zero or more relationship links 276. In an alternate embodiment, one or more relationship links 276 may be associated with a relationship group 292. A relationship group 292 may therefore be configured to provide a container for a set of relationship links. A relationship group 292 may comprise relationship links 276 with different LinkTypes 472.

The group module 254 is operable to define relationship groups 292. The group module 254 may also be further operable to associate a relationship group 292 within the set of stored relationship groups with zero or more relationship links 276. In an alternate embodiment, the group module 254 may be operable to associate relationship links 276 with relationship groups 292.

As shown in FIG. 4, a relationship group may comprise a definition or DisplayName 478 attribute configured to receive text-based content (e.g. numbers, letters, mixed character strings). Relationship groups 292 may be used to, for example, facilitate the visual display of relationship links and taxonomy elements. For example, the group module 254 may also be operable to display components of an extension taxonomy (e.g. taxonomy elements 272) on a terminal 224, 226 based on their associated relationship group 292.

Figure 5:
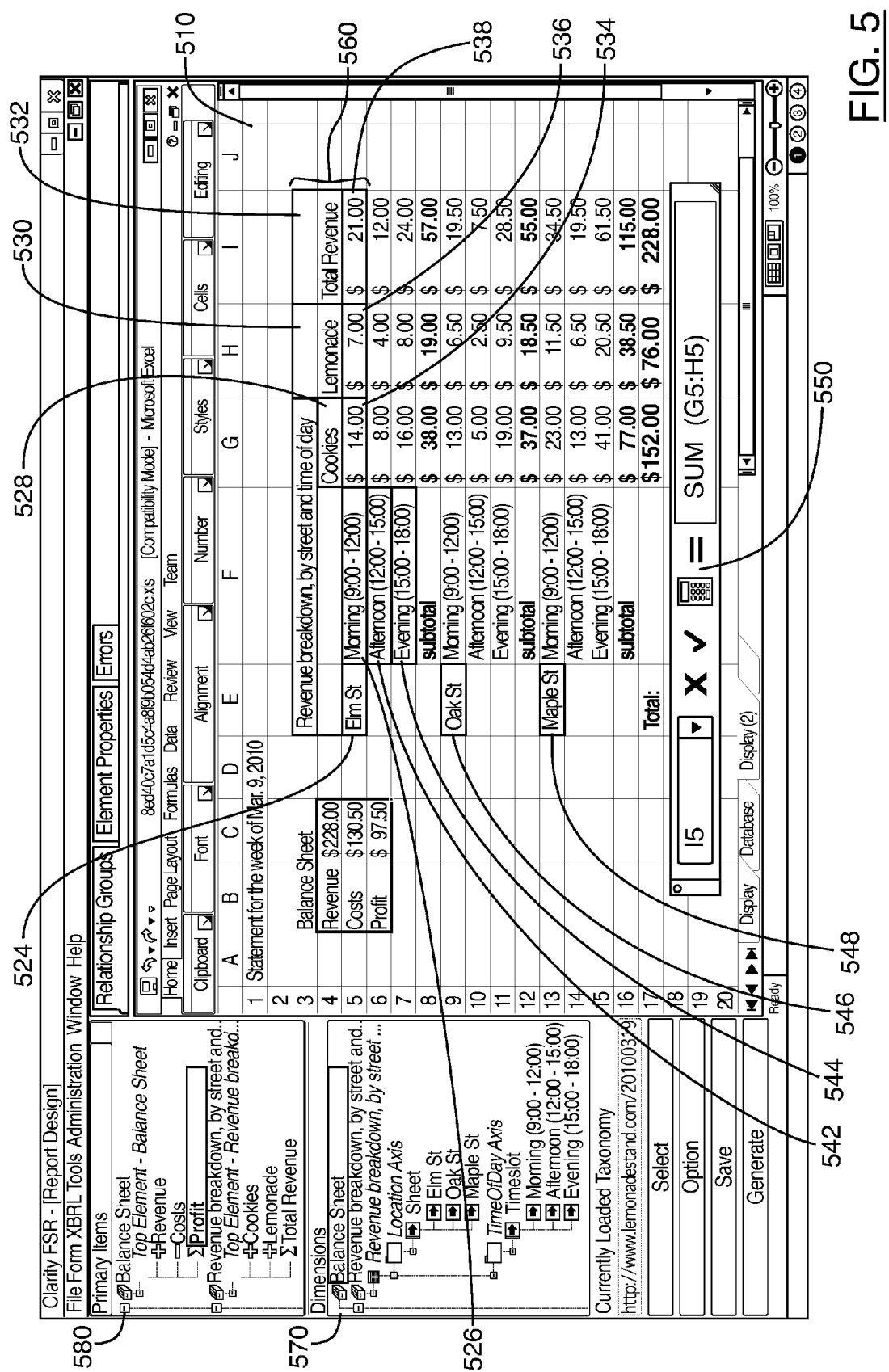
FIG. 5 is an example screen shot of a user interface for defining an extension taxonomy.

At Step 310 system 200 accesses a source document 260. For example, the selection module 240 may be operable to display a list of source documents 260 available in the file system 280 on a terminal 224, 226. A user may select a source document 260 from the list of source documents. In response to selection of the source document 260 the selection module may be further operable to open the source document 260 and, for example, display it on a terminal 224, 226. FIG. 5 shows an example screen shot of a user interface for defining an extension taxonomy as may be generated by the selection module 240. The screenshot comprises a source document 510.

A source document 260 may comprise a set of locations 262 that may be referenced by, for example, the file system 280 or memory 228. Each location 262 may be configured to receive text-based content such as, for example, words, numbers or mixed character strings. For example, in Microsoft Excel locations 262 are referred to as "Named Ranges". Similarly, in Microsoft Word locations 262 are referred to as "Bookmarks". Excel, Word and other document management programs may provide the ability to create Named Ranges, Bookmarks or other similar pointers to locations within a document. These locations may be given a "name" and system 200 may be operable to retrieve a location based on its associated "name". System 200 may then extract the text-based content stored by a location 262. These functions are normally provided using, for example, an Application Programming Interface (API), which may be provided by the document management program and may interface with the file system 280. Other text-based documents such as, for example, Adobe Acrobat PDF's may also comprise locations 262 that may be referenced by the file system 280 or memory 228. For example, FIG. 5 shows an Excel spreadsheet 510 comprising a set of cell locations (e.g. 528, 530, 532) that may receive text based content.

A source document 260 may also comprise a location map 264, which identifies each location in the set of locations 262. This map may be used by the file system 280 or memory 228 to facilitate the process of identifying or referencing a particular location 262 within a source document 260. The location map may, for example, comprise a hash table or array of all the locations 262 within a source document 260.

Each location 262 in the source document 260 may also be associated with metadata 266. The metadata 266 may be used to define additional attributes for a location 262. For example, the metadata 266 may define formatting characteristics such as bold, italic, underline, or color for a location 262. Alternatively, the metadata may define the text-based content received by a location 262 based on other locations 262 within the source document 260 or another source document stored in file system 280.

In some embodiments, if system 200 detects that the contents of a location A are updated, then in response system 200 automatically updates the contents of any location B with metadata referring to the contents of location A.

In one embodiment, the metadata 266 of a location 262 may comprise a mathematical relationship between two or more locations 262 in a source document. For example referring briefly to FIG. 5, it is shown that the location 538 in the Excel Spreadsheet 510 is associated with the mathematical formula 550. The text-based contents of location 538 are defined as the sum of locations 534, and 536. The text-based content received by the location 538 is equal to the number "21.00" (e.g. cells G5+H5), while the metadata for location 538 stores the formula 550 used to determine the text-based contents of location 538 (e.g. the formula 550=SUM[G5:H5]). If the text-based contents of location 534 were updated to the number "15.50" then system 200 may be operable to automatically update the contents of location 538 to receive the number "22.50" (e.g. G5+H5="15.50"+"7.00").

In an alternate embodiment the metadata 266 of a location 262 may comprise a string concatenation relationship between two or more locations in a source document such that the text-based content received by the location 262 is equal to the joining of the text-based content of the locations referred to by the metadata 266 (e.g. a string concatenation operation). Those skilled in the art will appreciate that other relationships between locations 262 may be defined using the location metadata 266.

At Step 312, the selection module 240 designates a selected portion of a source document 260. The selected portion may comprise at least one location from the set of locations 262. The selected portion may include multiple locations from the set of locations 262.

The selected portion may comprise a first location A and a second location B. The metadata 266 associated with the first location A may refer to the second location B in the selected portion. The selection module 240 may also be operable to retrieve a file system 280 or memory 228 reference to each location 262 using the location map 264.

For example, in at least one embodiment the selection module 240 may display a source document 260 on a terminal 224, 226 (as described above with reference to Step 310). A user may then operate a terminal 224, 226 to select a portion of a source document 260. Based on the portion of the document selected by the user the selection module 240 may be configured to designate the selected portion by, for example, highlighting the selected portion (e.g. by changing the background color of the selected portion). For example, Referring briefly to FIG. 5 a selected portion 560 of an Excel spreadsheet 510 is shown. This selected portion has been designated by changing the borders and background color of the selected spreadsheet cells in order to contrast them with the unselected neighboring cells. Those skilled in the art will appreciate that visual designation of a selected portion may be achieved in many different ways in various implementations.

In another embodiment, the selection module 240 may be operable to designate the selected portion based on a taxonomy element 272 from the repository 270. For example, the selection module may be operable to display a list of taxonomy elements 272 stored in the repository 270 on a terminal 224, 226. A user may then operate a terminal 224, 226 to select a taxonomy element from the displayed list. In response the selection module 240 may be operable to identify a source document 260 and one or more locations 262 that correspond to the selected taxonomy element 272 based on, for example, the attributes of the selected taxonomy element 272.

In another embodiment, the selection module 240 may be operable to designate the selected portion based on an input file containing, for example, taxonomy element names, source document names and/or file system 280 or memory 228 location references.

At Step 314 system 200 processes the text-based content and/or metadata 266 of locations 262 in the selected portion of the source document. System 200 may be operable to determine if the text based content or metadata 266 in the selected location corresponds with an existing taxonomy element 272 stored in the repository 270. For example, the text-based content received by the location 262 in the selected portion may comprise the Name 428 of a taxonomy element. For example, referring briefly to FIG. 5 there is shown a selected portion 560 comprising a location 532 that contains the text-based content "Total Revenue" that may correspond with the Name 428 of a taxonomy element 272 in the repository 270.

Figure 8:
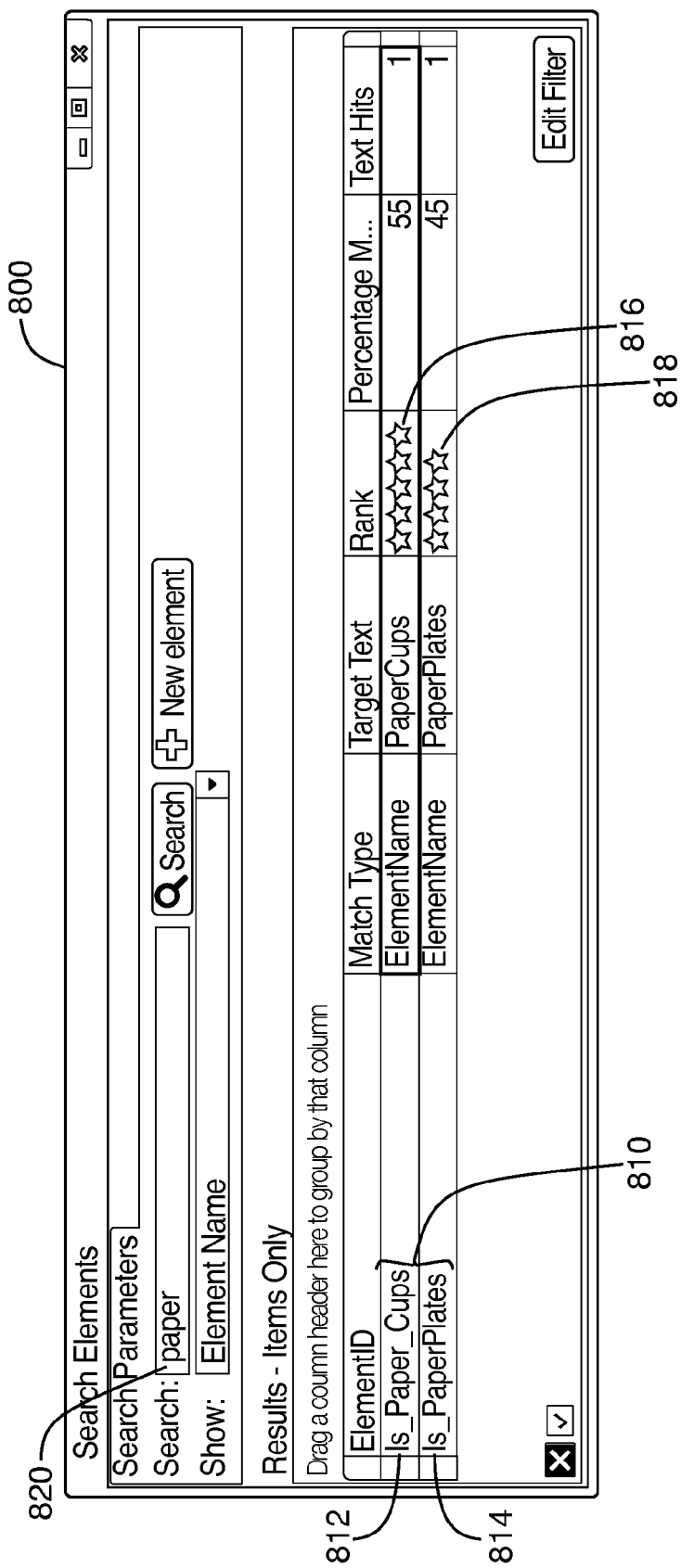
FIG. 8 is an example screen shot of a taxonomy element search.

In one embodiment, extension module 242 may use the text-based content from the location 262 to generate a database query. For example the SQL query "select * from Taxonomy where Name="Total Revenue" may be generated based on the text-based content received by location 532 in FIG. 5. The query may be used by the extension module 242 to search the repository 270 for a taxonomy element 272 with a similar or identical Name 428. For example, FIG. 8 shows an example screen shot of a taxonomy element search screen as may be generated by extension module 242.

In alternate embodiments the text-based content or metadata received by the location 262 may correspond with other attributes of a taxonomy element 272 as previously described with respect to FIG. 4. Those skilled in the art will appreciate that analysis of the selected portion may take alternate forms in alternate embodiments.

At Step 316, system 200 generates one or more new taxonomy elements. This may comprise, for example, generating a new Taxonomy_Element record 272 in the repository 270. For example, where the extension module 242 is unable to identify a corresponding taxonomy element 272 to be associated with the location 262, the extension module 242 may be further operable to generate a new generic or blank taxonomy element 272.

The extension module 242 may also be operable to define a new taxonomy element 272 comprising attributes based on the text-based content or metadata received by a location 262 in the selected portion. For example, the Name 428 attribute of a new taxonomy element may be based on the text-based content "Total Revenue" received by location 532 in FIG. 5. Those skilled in the art will appreciate that the extension module may generate new taxonomy elements 272 in response to other conditions in addition to the inability of the extension module 242 to identify a pre-existing taxonomy element 272 in the repository 270 (e.g. a corrupt taxonomy element in the repository may trigger the generation of a new taxonomy element).

Figure 9:
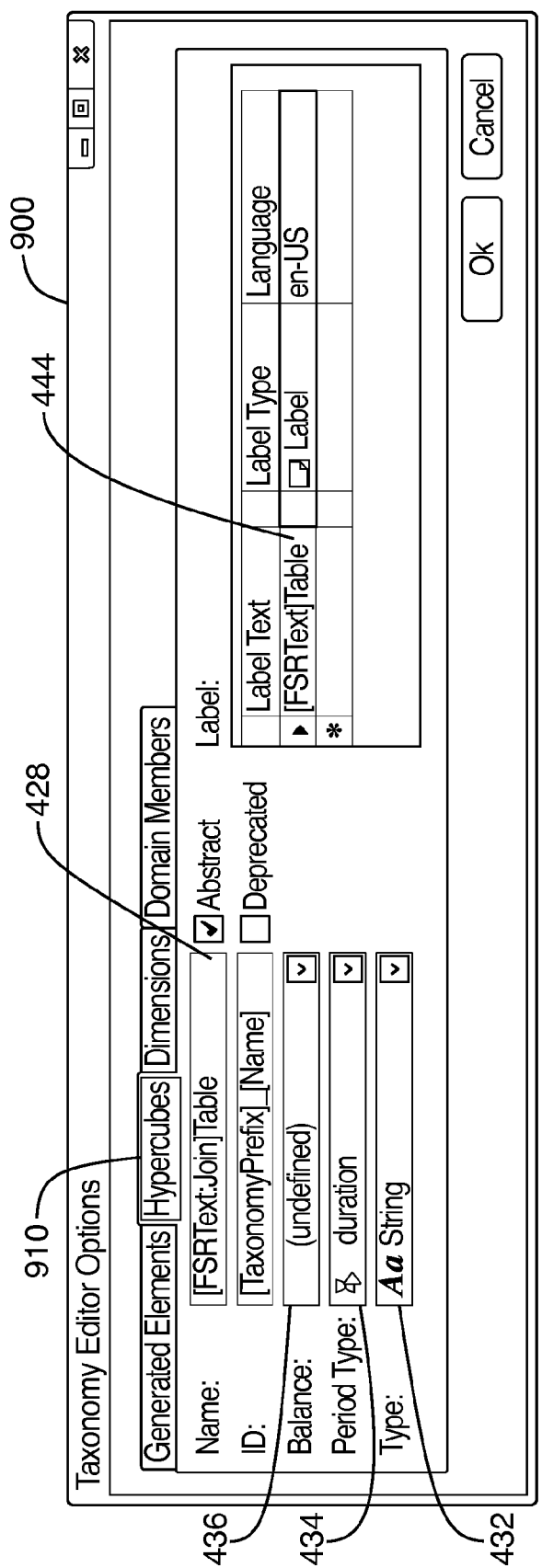
FIG. 9 is an example screen shot of a user interface for specifying default taxonomy element attributes.

In an embodiment, system 200 may provide an interface for specifying default attributes and labels of taxonomy elements 272. For example, referring to FIG. 9 there is shown a screen shot 900 of a user interface displaying taxonomy element attribute defaults as may be generated by system 200 when, for example, when generating new taxonomy elements at Step 316. The screen shot 900 shows several attributes of a taxonomy element associated with a hypercube 910 or definition Linktype 472. Newly created hypercube taxonomy elements (e.g. elements of an n-dimensional array as described below) may have the suffix "Table" automatically added to their Name 428 attribute as shown. Similarly, the suffix "Table" may also be added to the default taxonomy label text 444 for hypercube taxonomy elements. Other default attributes including: the balance type 436; the period type 434; and the taxonomy element type 432, may also be defined using the default attribute interface 900. Users may set up system 200 defaults for taxonomy element attributes depending on, for example, the LinkType 472 associated with the taxonomy element 272.

At Step 318, system 200 associates a taxonomy element 272 with a location 262 in the selected portion of the source document 260. Extension module 242 is operable to associate a taxonomy element 272 with a location 262 in the selected portion designated by the selection module 240.

The extension module 242 may associate a taxonomy element 272 with a location 262 based on the text-based content received by the location 262. The extension module 242 may also be further operable to associate a new taxonomy element 272 generated at Step 316 with the location 262 that triggered the extension module 242 to generate the new taxonomy element 272 at Step 316.

For example, at Step 314 the extension module 242 may use the text-based content received by a location 262 in the selected portion to successfully locate a taxonomy element L in the repository 270. Alternatively, the text-based content received by the location 262 may be used to generate a new taxonomy element at Step 316. At Step 318, the extension module 242 may associate the located taxonomy element L with the location 262 that resulted in the successful location of the taxonomy element L at Step 314. For example, referring to FIG. 5, the selected portion 560 comprises a location 532 containing the text-based content "Total Revenue'. The location 532 may be associated with a taxonomy element 272 with a Name 428 equal to "Total Revenue" at Step 318 based on the analysis and/or generation steps performed at Step 314 and Step 316 respectively.

In another embodiment, the selected portion may comprise a first location and a second location and the extension module 242 may be further operable to associate a first taxonomy element with the first location and a second taxonomy element with second location. For example, referring to FIG. 5 the selected portion 560 comprises a first location 530 and a second location 532. A first taxonomy element A corresponding with the first location 530 and a second taxonomy element B corresponding with the second location 532 in the selected portion 560 may be generated by the extension module 242 at Step 316, for example. In response to the generation of new taxonomy elements at Step 316 the extension module 242 may associate the first taxonomy element A with the first location 530 and the second taxonomy element B with the second location 532 at Step 318. Those skilled in the art will appreciate that the extension module 242 may associate any number of taxonomy elements 272 with locations 262 in the selected portion. In this manner taxonomy elements may be associated with concepts in a source document 260.

Furthermore, the extension module 242 may be operable to associate a taxonomy element 272 with a location 262 in the selected portion based on the metadata 266 associated with the location 262. For example, as described previously, the metadata 266 may comprise a mathematical formula. The extension module 242 may be operable (e.g at Step 314) to use this formula to identify a taxonomy element 272 in the repository based on, for example, the mathematical relationship the location 262 has with other locations and corresponding taxonomy elements. The system 200 may also be operable to establish calculation relationship links between taxonomy elements.

At Step 320, system 200 associates the taxonomy element 272 with a taxonomy element label. This may comprise, for example, generating a taxonomy element label 278 with an ElementID 442 equal to the ElementID 424 of the taxonomy element 272. The label module 246 is operable to associate a taxonomy element 272 with zero or more taxonomy element labels 278.

A taxonomy element label is a human readable name for an element. Regulatory bodies may prohibit organization from using previously defined taxonomy elements to represent different financial concepts as this may reduce the regulatory bodies ability to make comparisons between different organizations report filings. Labels may be used to generate a rendering that will closely resemble the submitted report. Taxomomy element labels 278 are configured to receive text-based content. System 200 uses labels to facilitate the mapping of an organization's references for taxonomy elements 272 to standard references used by a regulatory body. System 200 may also use labels to refer to the same taxonomy element in different languages. System 200 may associate a taxonomy element 272 with one or more taxonomy element labels 278. For example, different organizations may describe the same financial concept such as "us-gaap:FixedAssets" in different ways. One organization may describe their us-gaap:FixedAssets as "Buildings and Vehicles" while another company may describe the same concept as "Property, Manufacturing Plants, and Equipment". System 200 enables organizations to define one or more taxonomy element labels 278 for each taxonomy element 272 to facilitate, for example, the cross referencing of organizational and regulatory financial concepts.

As shown in FIG. 4, system 200 may differentiate taxonomy element labels 278 associated with the same taxonomy element 272 using, for example, the LabelType 496 and Language 416 attributes. In XBRL there are 12 different label types that may be used'

The LabelType field in Taxonomy_Label table 278 may take the following values:

label=1, http://www.xbrl.org/2003/role/label—Standard label for a concept.;

terse=2, http://www.xbrl.org/2003/role/terseLabel—Short label for a concept, often omitting text that should be inferable when the concept is reported in the context of other related concepts;

verbose=3, http://www.xbrl.org/2003/role/verboseLabel—Extended label for a concept, making sure not to omit text that is required to enable the label to be understood on a stand alone basis;

negative=4, http://www.xbrl.org/2003/role/negativeLabel total=5, http://www.xbrl.org/2003/role/totalLabel—The label for a concept for use in presenting values associated with the concept when it is being reported as the total of a set of other values;

documentation=6, http://www.xbrl.org/2003/role/documentation—Documentation of a concept, providing an explanation of its meaning and its appropriate usage and any other documentation deemed necessary;

periodStart=7, http://www.xbrl.org/2003/role/periodStartLabel;

periodEnd=8, http://www.xbrl.org/2003/role/periodEndLabel;

negated=9, http://xbrl.us/us-gaap/role/label/negated;

negated Period End=10, http://xbrl.us/us-gaap/role/label/negated PeriodEnd;

negatedPeriodStart=11, http://xbrl.us/us-gaap/role/label/negated PeriodStart; and negatedTotal=12 http://xbrl.us/us-gaap/role/label/negatedTotal.

Each presentation link may specify a preferred label type (e.g. PreferredLabelType 498 of Relationship_Link table 276). This may instruct a rendering engine (e.g. a rendering engine external to system 200) that when displaying the child element identified in the link, that it should display the text of the label of that type, if available, for that element (in the rendering engine's configured language).

As an illustrative example, a taxonomy author may need to present the same taxonomy element, Assets, with different descriptive labels, depending on the context in which it is used. For instance, when presenting it in some kind of roll up where Assets is the total of other things, he desires it to be rendered as "Assets, Total". When presenting in a balance sheet, against Liabilities for example, the taxonomy author may desire it to be rendered as "Assets". Since labels are defined at the element level, not at the presentation link level, the author must provide both of these labels against the element itself. However, he may (and must) assign different types for these labels. Then, at the presentation link level, the taxonomy author may identify what type of label should be displayed for that particular link. The rendering engine can then pick out the correct label text to render in each circumstance. If the taxonomy author provides French labels for each type, then the rendering engine could pick out the right text when system 200 is configured to render in French.

Negated label types may be extra label types provided by a base taxonomy, such as US-GAAP. These indicate to a rendering engine that the value rendered should be the opposite of the value recorded in the instance. This usually results because of a subtraction calculation link. For example, using the simple calculation Net=Assets−Liabilities. In an instance document, Net=$100, Assets=$135, Liabilities=$35. The calculation verification passes. However, it may appear confusing if a rendering engine presents the following:

Assets: $135
Liabilities: $35
Net (Total): $100

The taxonomy author can express a desire for the value to be rendered as the opposite value by using a negated label as the preferred label type in the presentation link. Rendering engines can be configured to treat these specific label types, and render the following:

Assets: $135
Liabilities (negated): ($35)
Net (Total): $100

Embodiments include the ability to add labels of different types, and to express the preferred label type at the presentation link level.

System 200 may also specify a PreferredLabelType 498. System 200 may use the PreferredLabelType 498 when, for example, generating or displaying a taxonomy element in order to select a default taxonomy element label 278 (e.g. where the taxonomy element 272 has more than one taxonomy element label 278). System 200 may also use LabelType 496 and Language 416 to render taxonomy elements 272 in association with different taxonomy element labels 278 depending on the current context. For example, if a taxonomy element A related to the financial concept "Assets" is being used in a balance sheet, system 200 may use LabelType (1) "Assets" when displaying the taxonomy element 272. However, if taxonomy element A was being displayed as part of a roll up calculation, system 200 may use the LabelType (5) "Assets, Total" when displaying the taxonomy element 272. System 200 may use the Language field 416 in a similar manner to, for example, match the language of a taxonomy element label 278 with the language settings of the operating system used by system 200 or a default language associated with a base taxonomy.

At Step 322, system 200 defines a location link 274 between a taxonomy element 272 and a location 262 in the selected portion of the source document 260. System 200 is operable to define location links 274 directly between a taxonomy element 272 and a source document 260. A location link provides a persistent association between a taxonomy element 272 and a location 262. Each location in the source document is configured to receive text-based content and may further relate to additional locations. These additional locations in the source document are configured to receive text-based content that system 200 may use to retrieve financial data values for the associated taxonomy elements during the tagging process described at step 106 of FIG. 1.

An organization may manually define taxonomy elements by manually identifying and inputting the associated financial data values from their financial data records. However, when the underlying financial data records are updated then the reports, taxonomy elements, tagged financial data values, attributes, and relationships that relate to those updates must also be manually identified and updated. Financial data is fluid and updates occur frequently, making this update process time-consuming and error prone.

System 200 defines a location link 274 between a taxonomy element 272 and a location 262 in the source document 260. When the text-based content received by the location 262 or an associated location 262 in the source document 260 is updated, system 200 may use the location link 274 to identify the update and to in turn update associated reports, taxonomy elements, attributes, tagged financial data values, etc.

In alternate embodiments, system 200 may indirectly define location links between a taxonomy element 272 and a source document 260 via, for example, one or more intermediary attributes of a taxonomy element 272. For example, in the embodiment shown in FIG. 4 Taxonomy_Elements 272 may be associated with Taxonomy_Labels 278. The Taxonomy_Labels may be associated with Location_Links 274 to Source Objects 430 (e.g. indirectly linking a taxonomy element 272 to a source document 260).

For example, the generation of a location link 274 may comprise generating a new location link 274 with, for example, the following attributes: an LabelID attribute 452 equal to the LabelID 438 of the taxonomy element label 278 to which the location link 274 will be associated; an ObjectID 454 equal to the ObjectID 446 of the source document 260 comprising the selected portion; and, a RangeName 456 equal to the location 262 within the selected portion of the source document 260 (e.g. a pointer or reference to the location 262 in the file system 280).

The connection module 244 is operable to define a location link 274 between a taxonomy element 272 and a location 262 in the selected portion. For example, once the extension module 242 has determined an association between a taxonomy element 272 and a location 262 in the selected portion the connection module 244 may be configured to more permanently establish the association using a location link 274. The location link 274 may then be saved in the repository 270 in association with the taxonomy element 272.

For example, referring to FIG. 5 the selected portion 560 comprises a first location 530 and a second location 532. A first taxonomy element A corresponding with the first location 530 and a second taxonomy element B corresponding with the second location 532 in the selected portion 560 may be generated by the extension module 242 at Step 316, for example. At Step 322 the connection module 244 may define a first location link between the first taxonomy element A and the first location 530 and a second location link between the second taxonomy element B with the second location 532. Those skilled in the art will appreciate that the connection module 244 may define location links between each taxonomy element 272 and location 262 pair as may be determined or associated by the extension module 242 at Steps 314, 316 and 318.

At Steps 324, 326, 328 and 330, system 200 defines hierarchical relationships between taxonomy elements 272 using relationship links 276 (e.g. thereby defining a hierarchical classification of taxonomy elements). The relationship module 248 may be operable to define relationship links 276. The relationship links may be based on the text-based content, metadata, spatial relationships or other features of the locations 262 in the selected portion of the source document 260.

A taxonomy is a classification of taxonomy elements arranged in a hierarchical structure using relationship links between taxonomy elements. As previously discussed, relationship links 276 have a LinkType attribute 472 that defines the type of relationship link (e.g. presentation, calculation or definition). Relationship links 276 may also belong to a relationship group 292. For a given LinkType 472 and relationship group 292 a taxonomy may be comprised of taxonomy elements 272 (e.g. nodes) and relationship links 276 that form an acyclic directed graph of nodes.

System 200 may be configured such that within the context of a single Relationship Group 292 presentation links form their own acyclic graph, calculation links form their own acyclic graph, and all other link types, comprising definition links, form their own acyclic graph. In some embodiments, each relationship group actually has 3 acyclic graphs within it for: presentation, calculation, and definition relationships.

An extension taxonomy 284 may be formed by a collection of taxonomy elements 272 and relationship links 276, where each relationship link 276 is a directional link connecting one taxonomy element 272 to another taxonomy element 272. For a given LinkType 472 set (e.g. presentation, calculation or definition) and relationship group 292 there should be no path in an extension taxonomy 284 that starts at some taxonomy element V and follows a sequence of relationship links 276 that eventually loop back or terminate at V (e.g. no directed cycles). In some embodiments, system 200 is operable to validate the relationship links 276 using a set of validation rules to determine whether there are any directed cycles. If a directed cycle is detected then a validation error may be generated. Each taxonomy element 272 may have a relationship link 276 to zero or more child taxonomy elements 272, which are below it in the tree (by convention, trees grow down, not up). A taxonomy element 272 that has a child is called the child's parent taxonomy element (e.g. alternatively ancestor taxonomy element, or superior). Children with the same parent taxonomy elements 272 are called siblings. In an acyclic directed graph each taxonomy element 272 may have a relationship link 276 to one or more parent taxonomy elements. A taxonomy will have at least one root taxonomy element 272 having no relationship link 276 to a parent taxonomy element. In some embodiments, the acyclic graph is subdivided in scope between relationship groups, and further by presentation links, calculation links, and definition links (e.g. LinkType 472 sets), as described herein. Also, each such graph may have more than one root element, though our current implementation supports only one root element. Although directed cycles are not allowed, undirected cycles are allowed in an extension taxonomy. For example, a particular taxonomy element A may reach another taxonomy element B via more than one sequence of relationship links 276.

Referring briefly to FIG. 4 system 200 may not explicitly store the relationships between siblings in the Relationship_Link table 276. Instead, system 200 may define the relative ordering of siblings with the same ParentElementID 464 using SortOrder 468. For example, records of the Relationship_Link table 276 may comprise the following:

| ParentElementID | ChildElementID | SortOrder |
|---|---|---|
| 1 | 2 | 20 |
| 1 | 4 | 13.2 |
| 2 | 5 | 8 |
| 2 | 6 | 2 |
| 1 | 3 | 10 |

The relative positioning of Relationship_Links 276 may be used to define, for example, the presentation of taxonomy elements in, for example, an XBRL report. For example, based on the SortOrder values presented above system 200 may generate a hierarchy of taxonomy elements as follows:

```
<Level 1>  Element 1
  <Level 2>    Element 3
               Element 4
               Element 2
    <Level 3>    Element 6
                 Element 5
```

In XBRL, as previously described, there are five types of relationship links (e.g. presentation, definition, calculation, label and reference). In an embodiment, system 200 may store all the types of relationship links 276 using a single table comprising, for example, a type attribute. For example referring to FIG. 4, system 200 may store all of the XBRL link types in the Relationship_Link table 276 which has a LinkType attribute 472, which may be used to differentiate between the presentation, definition, calculation, label and reference link types. In the embodiment shown in FIG. 4, system 200 stores XBRL label relationships using the Taxonomy_Label table 278. In alternate embodiments separate relationship link tables may be provided for each link type in a taxonomy. Relationship links may enable a taxonomy to be viewed as a one-dimensional representation of hierarchically related taxonomy elements 272.

System 200 may define presentation links between taxonomy elements 272 to define the hierarchical relationships between taxonomy elements 272 for taxonomy presentation, visualization and generation purposes. Presentation links may store information about relationships between taxonomy elements 272 in order to properly organize the concepts and content represented by taxonomy elements 272. For example, in XBRL presentation links may be used to establish relationships between taxonomy elements 272 so that their visual representation matches the visual representation of a financial reporting document such as a balance sheet.

Figure 6A:
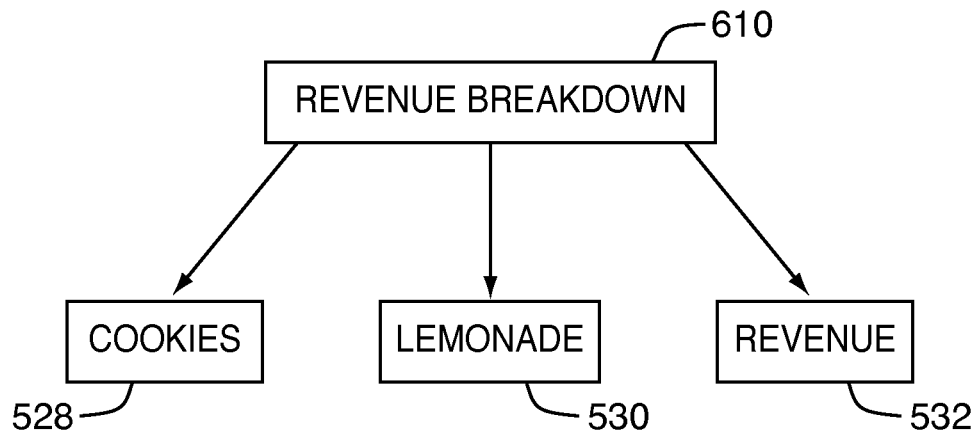
FIG. 6A is a graph based representation of taxonomy elements and presentation links.

For example, referring briefly to FIG. 5 there is shown a financial balance sheet 510. The balance sheet illustrates that the "Total Revenue" 532 of the organization is comprised of "Cookies" 528 and "Lemonade" 530. System 200 may represent each of these financial concepts by a taxonomy element 272. Referring briefly to FIG. 6A a one-dimensional graph-based view of taxonomy elements corresponding with the financial concepts 528, 530 and 532 is shown. The taxonomy elements in FIG. 6A are visually arranged in a hierarchical fashion based on their corresponding presentation links (e.g. as may be defined by the relationship module 248 at Step 330). For example, FIG. 6A illustrates that the financial concepts 528, 530 and 532 are all children of the abstract concept "Concept Breakdown" 610. Furthermore, the presentation links between taxonomy elements shown in FIG. 6A are based on the relationships between financial concepts shown in the balance sheet 510 of FIG. 5. The taxonomy generation module 252, for example, may be operable to interpret or traverse the presentation links defined by the relationship module 248 to produce a well formatted and ordered collection of taxonomy elements (e.g. as illustrated by FIG. 6A).

Figure 6B:
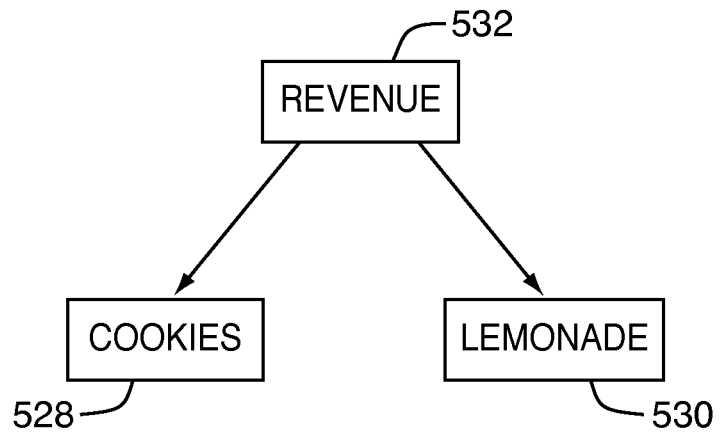
FIG. 6B is a graph based representation of taxonomy elements and calculation links.

System 200 may define calculation links to establish mathematical relationships or rules between taxonomy elements 272. System 200 may use calculation links to, for example, facilitate the validation of a taxonomy. For example, two taxonomy elements A and B may be summed to generate to a third taxonomy element C, such that C=A+B. System 200 may represent this relationship using calculation links by connecting taxonomy element C to taxonomy elements A and B. In one embodiment a calculation link may define both a relationship link 276 between two taxonomy elements 272 and a mathematical operation. In an alternate embodiment taxonomy elements 272 may comprise a Balance attribute 436 (e.g. debit or credit) and calculation links may be used to define simple mathematical relationships in which a parent taxonomy element is equal to the sum of its children's balances. Referring briefly to FIG. 6B, a one-dimensional graph-based view of taxonomy elements corresponding with "Total Revenue" 532 is shown. The taxonomy elements in FIG. 6B are visually arranged in a hierarchical fashion based on their corresponding calculation links (e.g. as may be defined by the relationship module 248 at Step 330). For example, FIG. 6B illustrates that "Total Revenue" 532 is mathematically comprised of "Cookies" 532 and "Lemonade" 530 (e.g. "Total Revenue"="Cookies"+"Lemonade"). Furthermore, the calculation links between taxonomy elements in FIG. 6B are based on the relationships between financial concepts shown in the balance sheet 510 of FIG. 5. Another example graph-based view of taxonomy elements 272 and calculation links based on balance sheet 510 is shown in the Primary Items pane 580.

System 200 may define definition links to represent multi-dimensional relationships between taxonomy elements 272. Organizations may need to report values for financial concepts (represented as taxonomy elements 272) in different contexts. A taxonomy element 272, along with the context in which it is reported, comprises a fact that may appear in, for example, an XBRL instance document.

A simple context may provide, for example, a reporting period and nothing else. For example, a company may wish to report values that appear in a simple two-dimensional table with financial concepts (e.g. revenue streams) running along the x-axis, and reporting periods (e.g. times of day) running along the y-axis. Referring briefly to FIG. 5 a first dimension of a two-dimensional table (e.g. x-axis) may comprise, for example, the fields "Cookies" 528, "Lemonade" 530 and "Total Revenue" 532. A second dimension (e.g. y-axis) may comprise the fields "Morning" 524, "Afternoon" 542 and "Evening" 544. System 200 may represent each of these fields using corresponding taxonomy elements 272. System 200 may use taxonomy elements 272 to define the dimensions (e.g. X and Y axes or column and row headers) of a two dimensional table.

In addition, a taxonomy element may comprise data (e.g. after tagging as described above with reference to Step 106 of FIG. 1). For example, the taxonomy element named "Cookies" 528 may be associated with the data value 534 comprising the text-based content "$14.00", as shown in FIG. 5. It will therefore be appreciated that taxonomy elements may also comprise the data members of a two dimensional table. For example, the taxonomy element "Cookies" 528 may be both the X-axis or row header for the two dimensional table and it may also store the data value "$14.00". System 200 may user taxonomy elements 272 to define the data members (e.g. cells) of a two dimensional table.

System 200 may use definition links to define relationships between taxonomy elements 272 representing dimensions. For example, the dimensional relationship between "Cookies" and "Morning" in FIG. 5 is that they are the X and Y axes of a table. Furthermore, system 200 may use definition links to define the relationships between taxonomy elements 272 representing the data members of a two dimensional table (e.g. the neighboring cells in a table).

A taxonomy element 272 may be associated with more than one context. A more complicated context may provide for reporting periods and locations. For example, referring briefly to FIG. 5 it is illustrated that the value "$14.00" 534 corresponds with the revenue for "Cookies" 528, in the "Morning" 526 on "Elm St." 524. These contexts may be understood as the axes of a three-dimensional table where, for example, revenue streams (528, 530, 532) are on the x-axis, reporting periods (526, 542, 544) are on the y-axis and locations (524, 546, 548) are on the z-axis. System 200 may use definition links to define the axes and members in a three dimensional matrix. Although it becomes more difficult to conceptualize physically, system 200 may use definition links between taxonomy elements 272 to define any number of dimensions and members in an n-dimensional array. Each taxonomy element 272 and any associated children may only be associated with at most one n-dimensional array.

Figure 6C:
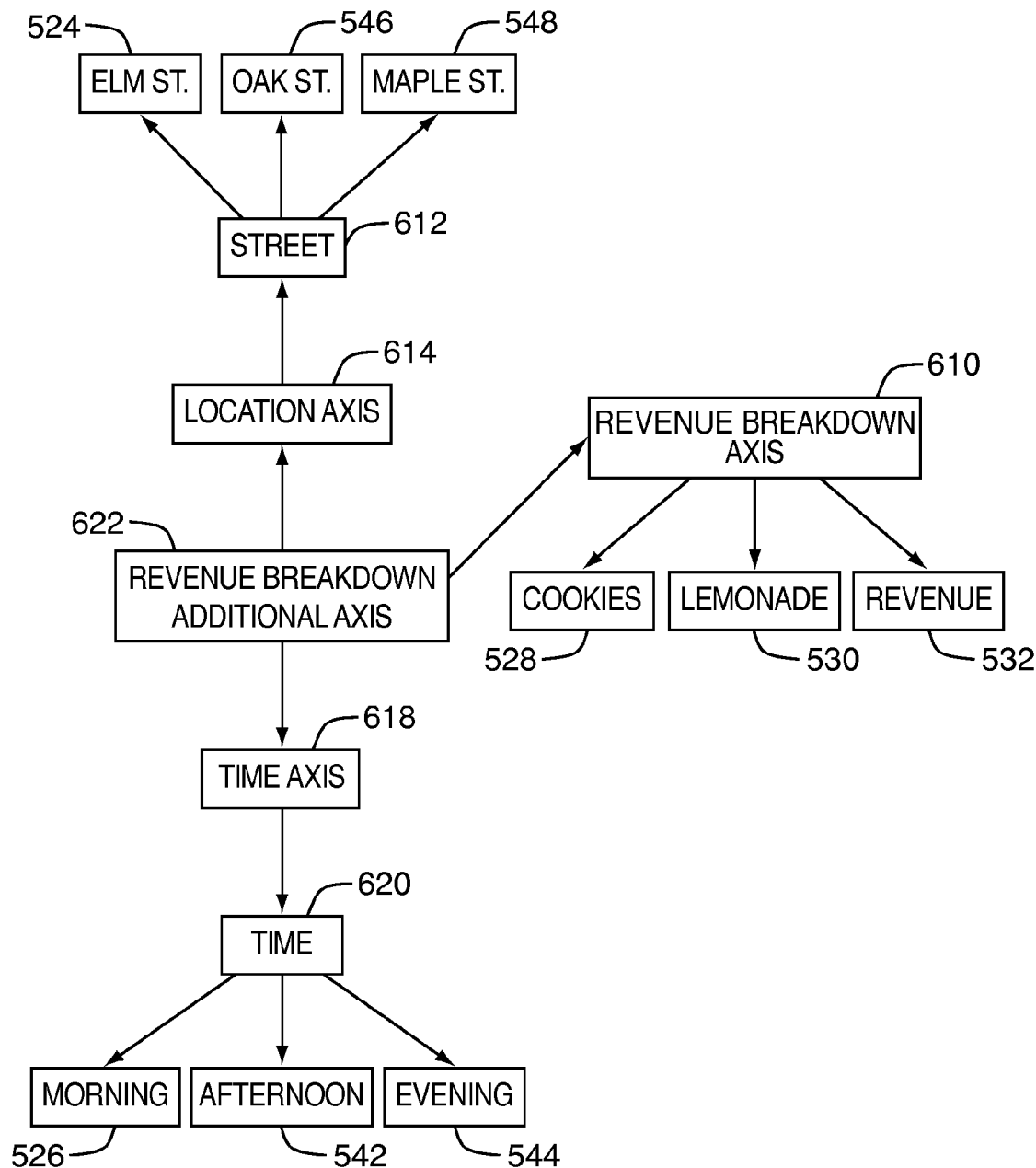
FIG. 6C is a graph based representation of taxonomy elements and definition links.

Referring briefly to FIG. 6C a one-dimensional graph-based view of taxonomy elements corresponding with "Revenue Breakdown" 622 is shown. The taxonomy elements in FIG. 6C are visually arranged in a hierarchical fashion based on their corresponding definition links (e.g. as may be defined by the relationship module 248 at Step 330). For example, FIG. 6B illustrates that "Revenue Breakdown" 622 is comprised of a financial concept breakdown axis 610, a location axis 614 comprised of streets 612, and a time axis 618 comprised of times 620. The dimensions links between taxonomy elements shown in FIG. 6C are based on the relationships between financial concepts shown in the balance sheet 510 of FIG. 5. Another example graph-based view of taxonomy elements 272 and dimension links based on balance sheet 510 is shown in the Dimensions pane 570 (only additional axes are shown, the concept breakdown representing the first axis).

At Step 330, system 200 defines relationship links 276 between taxonomy elements 272. This may involve, for example, generating new relationship link records 276 to be stored in the repository 270. A relationship link 276 may be associated with a parent taxonomy element using the ParentElementID 464 and a child taxonomy element using the ChildElementID 466 both of which may refer to different ElementIDs 424 of the Taxonomy_Element table 272. The relationship module 248 is operable to define one or more relationship links 276 between two taxonomy elements 272. For example, relationship links 276 may be used to define presentation, definition and calculation relationships between taxonomy elements 272 based on the type of relationship link 276.

FIG. 4 shows that a Relationship_Link 276 may have a LinkType attribute 472 that defines, for example, whether the relationship link 276 is a presentation, definition or calculation link.

At Step 324, system 200 processes the spatial arrangement of locations 262 in a selected portion of a source document 260 to identify and define relationship links 276.

The relationship module 248 may be further operable to define relationship links 276 based on the spatial arrangement of locations 262 in a selected portion of a source document 260. For example, if the selected portion comprises a first location A associated with a first taxonomy element Ea and a second location B associated with a second taxonomy element Eb, and location A is spatially located above location B in the source document 260 then the relationship module 248 may be operable to determine that taxonomy element Eb should be a child of taxonomy element Ea. The relationship module 248 may be operable to define a relationship link 276 between the first taxonomy element Ea and the second taxonomy element Eb such that Eb is a child of Ea (e.g. Ea is a parent of Eb).

For example, referring briefly to FIG. 5 a selected portion 560 comprising the locations "Cookies" 528, "Lemonade", 530, and "Total Revenue" 532 is shown. The locations 528 and 530 are spatially located to the left of location 532. Based on this spatial arrangement the relationship module 248 may be operable to determine that "Total Revenue" 532 is the parent of "Cookies" 528 and "Lemonade" 530 (e.g. "Total Revenue"="Cookies"+"Lemonade"). In response to the spatial analysis at Step 324, the relationship module 248 may define corresponding relationship links at Step 330. Any type of relationship link (e.g. presentation, relationship, definition, label or reference) may be generated based on the spatial relationship between locations 262.

At Step 326, system 200 processes the metadata and/or text-based content received by locations 262 in a selected portion of a source document 260 to determine and define relationship links 276. The relationship module 248 may be further operable to define relationship links 276 based on the text-based content or metadata 266 received by a location 262 in a source document 260. For example, a first taxonomy element Ea may be associated with a location A having metadata 266 comprising the mathematical relationship A=B+C (e.g. where B and C also represent locations in the source document 260 and may correspond with taxonomy elements Eb and Ec respectively). The relationship module 248 may be operable to define relationship links 276 between corresponding taxonomy elements Ea, Eb and Ec respectively such that Eb and Ec are children of Ea (e.g. Ea is equal to the sum of its children Eb and Ec). The mathematical expression that determines the relationship between taxonomy elements Ea, Eb and Ec is therefore based on the metadata 266 associated with the location A in the selected portion. Taxonomy element Ea may therefore be associated with a mathematical expression (e.g. metadata 266 comprising A=B+C) via a corresponding location link 274. If location B or C is also associated with a taxonomy element (e.g. Eb or Ec respectively) then taxonomy element A is associated with a mathematical expression that refers to at least a second taxonomy element (e.g. Eb or Ec).

For example, referring briefly to FIG. 5 the balance sheet 510 shows that the location 538 is equal to "$21.00". This is equal to the sum of the locations "$14.00" 534 and "$7.00" 536. System 200 may represent each of these financial concepts using taxonomy elements 272. Furthermore, the relationship module 248 may be operable to define calculation links between the taxonomy elements 272 such that a taxonomy element corresponding with location 538 has children taxonomy elements corresponding with locations 534 and 536 respectively (e.g. as shown in FIG. 6B). Any type of relationship link (presentation, relationship, definition) may be generated based on the metadata or text-based content received by locations 262.

At Step 328, system 200 processes the taxonomy to identify directed cycles. In at least one embodiment the relationship module 248 may be operable to define relationship links 276 (e.g. presentation links, calculation links and definition links) by adding a relationship link 276 to the repository 270. This relationship link 276 may be associated with a taxonomy element 272. However, a new relationship link must not violate the definition of a taxonomy described above (e.g. taxonomies are comprised of one or more acyclic directed graphs). The relationship module may therefore be further operable to detect cycles in the directed graph defined by associated taxonomy elements 272 and relationship links 276 before defining or storing a new relationship link 276 in the repository 270. The detection of cycles may be based on, for example, the relationship LinkType 472 and associated relationship group 292 of a relationship link 276. For example, for a given LinkType 472 set (e.g. presentation, calculation or definition) and relationship group 292 a taxonomy should not contain any directed cycles.

In some embodiments, system 200 further comprises a validation module operable to validate the one or more relationship links against a set of validation rules to determine if there is one or more validation errors; and upon determining that there is a validation error to generate a corresponding error message. For example, the validation module may be operable to detect cycles in a taxonomy at, for example, Step 328 using validation rules as follows:

(i) For each LinkType 472 set (e.g. presentation, calculation or definition) and for each relationship group 292 a copy C of the existing taxonomy elements 272 and associated relationship links 276 (e.g. the existing acyclic graph E) is made;

(ii) A new directed graph N is generated by adding a new relationship link R to the copy C of the existing acyclic graph;

(iii) Every directed relationship path of relationship links in the new directed graph N is traversed to determine if any taxonomy elements are their own parents (e.g. a directed path of relationship links starting at a taxonomy element A returns to taxonomy element A);

(iv) If a taxonomy element 272 is determined to be its own parent based on the addition of the new relationship link R then the new directed graph N contains a cycle;

(v) If a cycle is detected then the new relationship link R should not be added to the existing acyclic graph E, and a validation error may be generated;

(vi) If no cycles are detected then the existing acyclic directed graph E is updated with the new directed graph N by, for example, saving the new relationship link R in the repository 270.

At Step 332 system 200 associates a relationship group 292 with a location 262 in the selected potion of the source document 260. The process of associating a relationship group 292 with a location 262 may be substantially similar to the process of associating a taxonomy element 272 with a location 262 as previously described with respect to Step 318. For example, extension module 242 may be further operable to associate a relationship group 292 with a location 262 in the selected portion designated by the selection module 240. The extension module 242 may associate a relationship group 292 with a location 262 based on the text-based content received by the location 262. Furthermore, the extension module 242 may be operable to associate a relationship group 292 with a location 262 in the selected portion based on the metadata 266 associated with the location 262.

At Step 334 system 200 defines a group link 294 between a relationship group 292 and a location 262 in the selected portion of the source document 260. A group link 294 provides a persistent association between a relationship group 292 and a location 262. The process of defining a group link 294 may be substantially similar to the process of defining a location link 274 as previously described with respect to Step 322. For example, the connection module 244 may be further operable to define a group link 294 between a relationship group 292 and a location 262 in the selected portion. For example, once the extension module 242 has determined an association between a group link 294 and a location 262 in the selected portion at Step 332 the connection module 244 may be configured to more permanently establish the association using a group link 294. This group link 294 may then be saved in the repository 270 in association with the relationship group 292. When the text-based content received by the location 262 in the source document 260 is updated system 200 may use the group link 294 to identify the update and to in turn update associated reports, taxonomy elements, attributes, tagged financial data values etc.

At Step 336, system 200 stores the taxonomy components (e.g. taxonomy elements 272, location links 274, relationship links 276, relationship groups 292 and group links 294) in the repository 270. Those skilled in the art will appreciate that storage of taxonomy components may occur at various points during execution of the method. In at least one embodiment the storage module 250 is operable to store taxonomy elements 272 and associated location links 274, relationship links 276, taxonomy element labels 278, relationship groups 292 and group links 294 in the repository 270. A method of defining and storing the components of an XBRL extension taxonomy in the repository 270 was described above with reference to FIG. 4.

At Step 338, system 200 validates the taxonomy. This may include, as described further below with respect to FIG. 7, checking for duplicate or erroneous taxonomy element attributes and taxonomy element labels, ensuring that taxonomy elements comply with regulatory requirements and rules and ensuring that relationship links are properly defined, for example. Validation module 256 may, for example, automatically correct taxonomy errors, generate error message, and generate error resolution suggestions or quick fix remedies using a terminal 224, 226.

At Step 340, system 200 determines that the text-based content received by a location 262 of a source document 260 has been updated. For example, selection module 240 may display a source document on a terminal 224, 226 (see FIG. 5 for example). A user may modify this source document 260 using a terminal 224, 226 and these changes may be saved by, for example, selection module 240 in file system 280. For example, referring to FIG. 5 the location 532 comprising the text-based content "Total Revenue" may be updated to comprise the text-based content "Sales". In an embodiment, the file system 280 may detect changes to a source document 260 based on, for example, a timestamp denoting the last save date. In response to the detection of a change the file system may send a message to the label module 246, for example. Those skilled in the art will appreciate that there are many well known methods for system 200 to detect updates to source documents 260 including, for example, program level event triggers and file system scans.

At Step 342, system 200 updates the taxonomy element labels 278 associated with a taxonomy element 272. The label module 246 may be further operable to determine or update the text-based content of a taxonomy element label 278 based on the text-based content or metadata received by a location 262 in a source document 260. For example, a taxonomy element label 278 may be linked to a location 262 in a source document 260 using a location link 274. Using the location link 274 the label module 246 may reference the text-based contents or meta-data of the location 262. The label module 246 may therefore update the taxonomy element label 278 based on the text-based content or metadata 266 received by the location 262 at any time by, for example, copying the text-based content from the location 262 to the taxonomy element label 278.

Continuing with the "Storefront" example from above, a taxonomy element 272 may have a taxonomy element label La comprising the LabelText "Total Revenue". This taxonomy element label La may be linked via a location link 274 to a source document 260 that comprises a location Pa comprising the text-based content "Total Revenue" (e.g. as shown by location 532 of FIG. 5). When the location Pa is updated at Step 340 to comprise the text-based content "Storefronts" the source document 260 or the file system 280 may generate a message that is sent to the label module 246. This message may comprise, for example, a file system 280 or memory 228 reference to the location 262 that has been updated. The label module 246 may use the contents of the message to look up a corresponding location link Ka in the repository 270 that has, for example, a similar or matching RangeName 456. The taxonomy element label 278 associated with the location link Ka may then be updated by the label module 246 via the location link 274 using the text-based content or metadata 266 from the updated location 262 that triggered the source document 260 to send the label module message. For example, the LabelText 444 of taxonomy element label La may be updated to "Sales" so that it corresponds with the text received by location Pa. In an alternate embodiment, system 200 may, for example, systematically process each location link 274 in the repository 270 to determine if the associated taxonomy element label 278 and the text-based content received by the associated location correspond. Those skilled in the art will appreciate that updates to taxonomy element labels 278 may occur at any time.

At Step 344 system 200 updates the definition (e.g. DisplayName 478) associated with a relationship group 292. The process of updating a relationship group definition may be substantially similar to the process of updating a taxonomy element label 278 as previously described with respect to Step 342. For example, the label module 246 may be further operable to determine or update the text-based content of the DisplayName 478 attribute based on the text-based content or metadata received by a location 262 in a source document 260. As previously discussed at Step 334, a relationship group 292 may be linked to a location 262 in a source document 260 using a group link 294. Using the group link 294 the label module 246 may reference the text-based contents or meta-data of the location 262. The label module 246 may therefore update the definition of a relationship group 292 based on the text-based content or metadata 266 received by the location 262.

At Step 346, system 200 generates an extension taxonomy 284. The taxonomy generation module 252 is operable to generate an extension taxonomy 284 based on the taxonomy elements 272 and associated location links 274, relationship links 276, taxonomy element labels 278, relationship groups 292 and group links 294 stored in the repository 270. The extension taxonomy 284 may be based on or extend a base taxonomy 282.

In at least one embodiment, system 200 may store the extension taxonomy 284 as a file or document in the file system 280, for example. In another embodiment, the extension taxonomy 284 may comprise more than one file or document. For example, XBRL taxonomies may be comprised of multiple files including: the schema, the presentation linkbase, the definition linkbase, the calculation linkbase, the label linkbase and the reference linkbase.

In at least one embodiment the location links 274 may be used to generate an XBRL label linkbase. Similarly, the relationship links 276 may be used to generate XBRL presentation, definition and calculation linkbases depending on the LinkType 472.

In alternate embodiments system 200 may store the extension taxonomy 284 as a database export file (such as an XML schema file, for example) that may be transmitted over the network 222 to a remote location. System 200 may need to generate an extension taxonomy 284 to facilitate, for example, submission of the taxonomy to a third party or validation of the taxonomy using a validation tool that is external to system 200.

Figure 7:
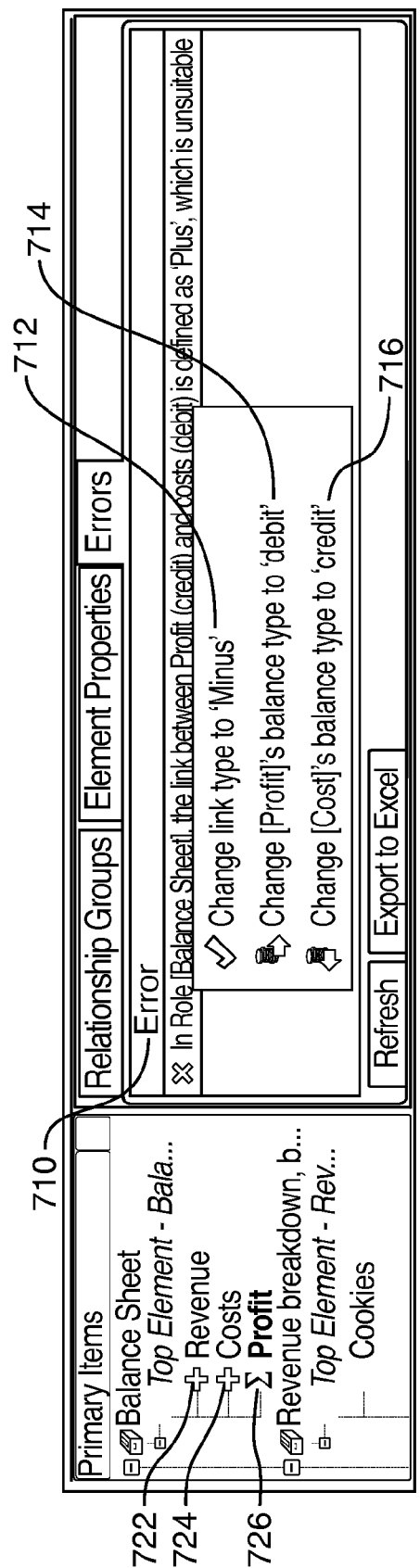
FIG. 7 is an example screen shot of a user interface displaying error messages.

Referring to FIG. 7 there is shown an example screen shot of a user interface displaying an error message 710 as may be generated by system 200 during, for example, taxonomy validation at Step 338. Validation module 256 may verify, for example, the following during taxonomy validation at Step 338.

No duplicate taxonomy element identifiers (e.g. ElementID 424);
No duplicate taxonomy element names (e.g. Name 428);
No duplicate taxonomy element label text (e.g. LabelText 444);
No use of deprecated elements from an outdated base taxonomy;
One standard taxonomy element label for each taxonomy element (e.g. LabelType=Label (1));
Taxonomy element labels contain text that will be accepted by the regulatory body; and
Multiple taxonomy element labels with the same label type and language do not exist for each taxonomy element (e.g. LabelType 496 and Language 416);

In addition to the general validation steps listed above, the validation module 256 may also be operable to validate the extension taxonomy against specific regulatory rules or requirements that may be selected based on, for example, a base taxonomy 282 associated with the extension taxonomy. For example, if the extension taxonomy is based on the US-GAAP taxonomy the validation module 256 may also verify the following:

Element names (e.g. Name 428) end with "Table" if and only if they are elements of an n-dimensional array;
Element names (e.g. Name 428) end with "Axis" if and only if they are a dimensional element;
Element names (e.g. Name 428) end with "Domain" or "Member" and have the type "us-types:domainitemType" if and only if the element is used as a domain member in a dimension;
Abstract elements must have type "stringItemType" and be "duration" elements;
Monetary elements are specified as "credit" or "debit";

Calculation links are between non-abstract elements with numeric types only; and, Calculation weights (e.g. + or −) are suitable for the elements they link (+ must be between debit and debit OR credit and credit; − must be between credit and debit OR debit and credit).

If validation module 256 encounters a problem or error during validation it may generate an error report or it may display an error message 710 on a terminal 224, 226 as shown, for example, in FIG. 7. In addition to generating error messages 710 the validation module 256 may be further operable to automatically resolve errors or to determine and provide error correction suggestions (e.g. quick fix remedies). System 200 may generate the quick fix remedies based on, for example, the validation rules associated with a base taxonomy 282.

For example, in FIG. 7 system 200 has defined the taxonomy element "Profit" 726 as "Revenue" 722 plus "Costs" 724 (e.g. using a plus calculation link), where "Revenue" 722 is a credit value and "Costs" 724 is a debit value. However, in XBRL a plus calculation link may only be used to join two debit values or two credit values. In FIG. 7 the validation module 256 has identified this problem and generated an error message 710 comprising the text "In Role [Balance Sheet], the link between Profit (credit) and Costs (debit) is defined as 'Plus', which is unsuitable". This error message may not provide a user, for example, with enough information to resolve the problem. The validation module 256 has also generated three error resolution suggestions 712, 714 and 716. For example, referring to suggestion 712 the validation module 256 has determined that one way to resolve the error is to change the plus calculation link to a minus calculation link. Based on the error resolution suggestions provided by the validation module 256, system 200 or a user, for example, may select the most appropriate course of action and validation of the extension taxonomy may continue.

Referring to FIG. 8 there is shown an example screen shot of a search screen 800 displaying a list 810 of taxonomy elements from a base taxonomy 282 as may be stored in the repository 270. The extension module 242 may be operable to generate the displayed search screen 800 based on the text-based content of a location 262 at, for example, Step 314. As previously described, system 200 may use the text-based content of a location 262 to search the repository 270 for a corresponding taxonomy element 272. If system 200 locates more than one possible corresponding taxonomy element 272 in the repository 270 or verification of the determined match is required the extension module 242 may display a list of candidate taxonomy elements 810 on, for example, a terminal 224, 226. In another embodiment, system 200 may display the search screen 800 on a terminal 224, 226 to provide an interactive search utility for taxonomy elements 272. The search screen 800 may therefore be used to facilitate the process of identifying taxonomy elements based on an organization's reporting requirements as described with respect to Step 102 of FIG. 1. For example in FIG. 8, system 200 has generated and displayed a list 810 of taxonomy elements based on the search term 820 "paper". The search term 820 may have been based on, for example, the text-based content of a location 262 or input from a terminal 224, 226.

Extension module 242 may rank the list 810 of taxonomy elements based on, for example, the frequency with which the taxonomy elements 272 are used and the probability that the taxonomy elements 272 correspond with the financial concept displayed by the text-based of the location 262. In the example screen shot taxonomy elements 272 have been ranked using a 5 star ranking system. For example, the taxonomy element 812 is associated with a 5 star rating 816, while the taxonomy element 814 is associated with a 4 star rating 818. Those skilled in the art will appreciate that there are many known methods for ranking search results in accordance with the embodiments described above.

It will be appreciated by those skilled in the art that all the components of a taxonomy may reside in the repository 270 and may be accessed or used on demand without necessarily generating a complete extension taxonomy 284. For example, taxonomy generation module 252 may be used to generate part of an extension taxonomy in memory 228 temporarily. Elements of the temporary taxonomy be dynamically accessed and utilized by the modules described herein or by other modules, processes and programs of system 200 or another system operatively connected to system 200. Alternatively, the taxonomy elements 272, location links 274 and other components of the repository 270 may be directly accessed by the modules described herein without referring to a generated extension taxonomy 284.

Other variations and modifications of different embodiments of the invention are possible. For example, the embodiments described herein have made reference to XBRL extension taxonomies. However, those skilled in the art will appreciate that in alternate or additional embodiments the extension taxonomies described herein may be used to represent any number of concepts in a hierarchical fashion. All such modifications or variations are believed to be within the sphere and scope of the invention as defined by the claims appended hereto.

The invention claimed is:

1. A computer system comprising:
at least one processor to analyze a portion of a source document selected by a user and determine an association between an element of a taxonomy and each location of a set of locations present within the selected portion of the source document, the at least one processor including:
a selection module to analyze the selected portion of the source document and identify the set of locations present in the selected portion of the source document based on a location map included with said source document that indicates each location within the source document;
an extension module to process each location of the identified set of locations in the selected portion of the source document and configured to:
retrieve a location from the identified set of locations, content of said retrieved location, and metadata associated with said retrieved location;
determine the presence of a pre-existing element of the taxonomy associated with the retrieved location based on at least one of said content of said retrieved location and said metadata associated with said retrieved location;
in response to determining that said taxonomy lacks said pre-existing taxonomy element, generate a new taxonomy element, determine and assign to said new taxonomy element a plurality of corresponding attributes based on an analysis of at least one of said content of said retrieved location and said metadata associated with said retrieved location, and link said new taxonomy element to said retrieved location of said source document; and in response to determining that a pre-existing taxonomy element associated with a corresponding retrieved location is corrupt, generate an associated new taxonomy element, determine and assign to said associated new taxonomy element a plurality of corresponding attributes based on an analysis of at least one of content of the corresponding retrieved location and metadata associated with the corresponding retrieved location, and link said associated new taxonomy element to the corresponding retrieved location;

a connection module to link said associated pre-existing taxonomy element to said retrieved location in response to said extension module determining said presence of said pre-existing taxonomy element;

a relationship module to define one or more relationship links between taxonomy elements; and a validation module to validate each of the relationship links.

2. The computer system of claim 1 wherein the selected portion of the source document comprises at least a first location and a second location; and wherein:

the extension module is further configured to associate a first taxonomy element with the first location and a second taxonomy element with the second location;

the connection module is further configured to define a location link between the first taxonomy element and the first location and a location link between the second taxonomy element and the second location; and the at least one processor further includes a storage module to store the taxonomy elements and the location links in a repository.

3. The computer system of claim 1 wherein a taxonomy element comprises attributes supported by eXtensible Business Reporting Language.

4. The computer system of claim 1 wherein the extension module is further configured to associate a taxonomy element with the retrieved location in the selected portion of the source document based on text-based content within the retrieved location in the selected portion of the source document.

5. The computer system of claim 1 wherein the at least one processor further includes a label module to associate a taxonomy element with at least one taxonomy element label, wherein the taxonomy element label is configured to receive text-based content.

6. The computer system of claim 5 wherein the label module is further configured to update the taxonomy element label based on a location link and text-based content within the retrieved location in the selected portion of the source document.

7. The computer system of claim 6 wherein the label module is further configured to update the taxonomy element label in response to an update of the text-based content within the retrieved location in the selected portion of the source document.

8. The computer system of claim 5 wherein the at least one processor further includes a taxonomy generation module to generate an extension taxonomy comprising taxonomy elements and associated taxonomy element labels.

9. The computer system of claim 5 wherein the validation module validates the taxonomy elements and taxonomy element labels against a set of validation rules to determine if there is one or more validation errors; and upon determining that there is a validation error to generate a corresponding error message.

10. The computer system of claim 9 wherein an extension taxonomy is associated with a base taxonomy comprising one or more taxonomy elements; and the validation module is further configured to select the set of validation rules based on the base taxonomy.

11. The computer system of claim 9 wherein the validation module is further configured, upon determining that there is a validation error, to determine one or more quick fix remedies specifying changes to the taxonomy to resolve the validation error based on the set of validation rules.

12. The computer system of claim 1 wherein the relationship module defines one or more relationship links between two taxonomy elements, wherein each relationship link is a directional link connecting the two taxonomy elements.

13. The computer system of claim 12 wherein the selected portion of the source document comprises at least a first location and a second location; and wherein:

the extension module is further configured to associate a first taxonomy element with the first location and a second taxonomy element with the second location; and the relationship module is further configured to define a relationship link between the first taxonomy element and the second taxonomy element based on a spatial arrangement of the first location and second location within the selected portion of the source document.

14. The computer system of claim 12 wherein the source document further comprises metadata associated with a first location in the selected portion of the source document; and the relationship module is further configured to define a relationship link between a first taxonomy element and a second taxonomy element based on the metadata associated with the first location.

15. The computer system of claim 14 wherein the selected portion of the source document comprises at least the first location and a second location; and the extension module is further configured to associate the first taxonomy element with the first location and the second taxonomy element with the second location.

16. The computer system of claim 15 wherein the metadata associated with the first location refers to the second location in the selected portion of the source document.

17. The computer system of claim 14 wherein the metadata is a formula that defines text-based content received by the first location.

18. The computer system of claim 12 wherein the validation module further validates the one or more relationship links against a set of validation rules to determine if there is one or more validation errors; and upon determining that there is a validation error to generate a corresponding error message.

19. The computer system of claim 12 wherein a first taxonomy element is associated with a mathematical expression that refers to at least a second taxonomy element; and the relationship module is further configured to define a relationship link between the first taxonomy element and the second taxonomy element based on the mathematical expression.

20. The computer system of claim 19 wherein the source document further comprises metadata associated with a first location in the selected portion of the source document; and the relationship module is further configured to determine the mathematical expression based on the metadata associated with the first location.

21. The computer system of claim 20 wherein the selected portion of the source document comprises at least the first location and a second location; and the extension module is further configured to associate the first taxonomy element with the first location and the second taxonomy element with the second location.

22. The computer system of claim 12 wherein taxonomy elements define both dimensions and members of an n-dimensional array; and the relationship module is further configured to define relationship links between taxonomy elements that define the dimensions of the n-dimensional array.

23. The computer system of claim 22 wherein the relationship module is further configured to define relationship links between taxonomy elements, and wherein each taxonomy element has a relationship link to one or more child taxonomy elements and, each taxonomy element and its one or more children are associated with at most one n-dimensional array.

24. The computer system of claim 22 wherein the relationship module is further configured to define relationship links between taxonomy elements that define the members of the n-dimensional array.

25. The computer system of claim 12 wherein the at least one processor further includes a group module to define a set of relationship groups, wherein a relationship group is configured to provide a container for a set of relationship links.

26. The computer system of claim 25 wherein relationship groups are associated with a definition configured to receive text-based content; and wherein:
the extension module is further configured to associate a relationship group with the retrieved location in the selected portion of the source document;
the connection module is further configured to define a group link between the associated relationship group and the retrieved location in the selected portion of the source document; and
the at least one processor further includes a label module to update a relationship group definition based on the group link and the text-based content within the selected portion of the source document.

27. The computer system of claim 12 wherein the validation module further validates the taxonomy elements and relationship links against a set of validation rules to determine if there is one or more validation errors; and upon determining that there is a validation error to generate a corresponding error message.

28. The computer system of claim 1 wherein the at least one processor further includes a taxonomy import module to import an existing taxonomy comprising one or more taxonomy elements; and to associate a taxonomy element from the imported taxonomy with the retrieved location in the selected portion of the source document.

29. A method comprising:
analyzing, via a processor, a portion of a source document selected by a user and determining an association between an element of a taxonomy and each location of a set of locations present within the selected portion of the source document, wherein the analyzing the selected portion of the source document comprises:
analyzing, via the processor, the selected portion of the source document and identifying the set of locations in the selected portion of the source document based on a location map included with said source document that indicates each location within the source document;
processing each location of the identified set of locations in the selected portion of the source document by:
retrieving a location from the identified set of locations, content of said retrieved location, and metadata associated with said retrieved location;
determining, via the processor, the presence of a pre-existing element of the taxonomy associated with the retrieved location based on at least one of said content of said retrieved location and said metadata associated with said retrieved location;
in response to the processor determining that said taxonomy lacks said pre-existing taxonomy element, generating, via the processor, a new taxonomy element, determining and assigning to said new taxonomy element, via the processor, a plurality of corresponding attributes based on an analysis of at least one of said content of said retrieved location and said metadata associated with said retrieved location, and linking said new taxonomy element to said retrieved location of said source document;
in response to the processor determining that a pre-existing taxonomy element associated with a corresponding retrieved location is corrupt, generating, via the processor, an associated new taxonomy element, determining and assigning to said associated new taxonomy element, via the processor, a plurality of corresponding attributes based on an analysis of at least one of content of the corresponding retrieved location and metadata associated with the corresponding retrieved location, and linking said associated new taxonomy element to the corresponding retrieved location; and
linking, via the processor, said associated pre-existing taxonomy element to said retrieved location in response to said determining said presence of said pre-existing taxonomy element;
defining, via the processor, one or more relationship links between taxonomy elements; and
validating, via the processor, each of the relationship links.

30. The method of claim 29 further comprising associating a taxonomy element with the retrieved location in the selected portion of the source document based on text-based content within the retrieved location in the selected portion of the source document.

31. The method of claim 29 further comprising associating a taxonomy element with at least one taxonomy element label, wherein the taxonomy element label is configured to receive text-based content.

32. The method of claim 31 further comprising updating the taxonomy element label based on a location link and the text-based content within the retrieved location in the selected portion of the source document.

33. A non-transitory computer-readable medium upon which a plurality of instructions are stored, the instructions for performing the steps of:
analyzing a portion of a source document selected by a user and determining an association between an element of a taxonomy and each location of a set of locations present within the selected portion of the source document, wherein the analyzing the selected portion of the source document comprises:
analyzing the selected portion of the source document and identifying the set of locations in the selected portion of the source document based on a location map included with said source document that indicates each location within the source document;

processing each location of the identified set of locations in the selected portion of the source document by:

retrieving a location from the identified set of locations, content of said retrieved location, and metadata associated with said retrieved location;

determining the presence of a pre-existing element of the taxonomy associated with the retrieved location based on at least one of said content of said retrieved location and said metadata associated with said retrieved location;

in response to determining that said taxonomy lacks said pre-existing taxonomy element, generating a new taxonomy element, determining and assigning to said new taxonomy element a plurality of corresponding attributes based on an analysis of at least one of said content of said retrieved location and said metadata associated with said retrieved location, and linking said new taxonomy element to said retrieved location of said source document;

in response to determining that a pre-existing taxonomy element associated with a corresponding retrieved location is corrupt, generating an associated new taxonomy element, determining and assigning to said associated new taxonomy element a plurality of corresponding attributes based on an analysis of at least one of content of the corresponding retrieved location and metadata associated with the corresponding retrieved location, and linking said associated new taxonomy element to the corresponding retrieved location; and linking said associated pre-existing taxonomy element to said retrieved location in response to said determining said presence of said pre-existing taxonomy element;

defining one or more relationship links between taxonomy elements; and validating each of the relationship links.

34. The computer system of claim 1 wherein the one or more relationship links include a plurality of presentation links to define a hierarchical relationship between taxonomy elements for presentation and form a first acyclical graphical representation of existing taxonomy elements and a plurality of calculation links to establish mathematical relationships between taxonomy elements and form a acyclical graphical representation of existing taxonomy elements, and wherein validating each of the relationship links includes:

in response to a relationship link being a presentation link, adding the relationship link to the first acyclic graphical representation of existing taxonomy elements and corresponding presentation links to produce a new graphical representation with the added relationship link;

in response to the relationship link being a calculation link, adding the relationship link to the second acyclic graphical representation of existing taxonomy elements and corresponding calculation links to produce the new graphical representation with the added relationship link;

analyzing the new graphical representation and identifying a validation error in response to detecting a cycle in the new graphical representation based on incorporating the added relationship link; and updating existing relationship links with the added relationship link in response to an absence of the validation error in the new graphical representation.

* * * * *